(12) United States Patent
Berger et al.

(10) Patent No.: US 8,676,617 B2
(45) Date of Patent: Mar. 18, 2014

(54) ARCHITECTURAL DESIGN FOR SELF-SERVICE PROCUREMENT APPLICATION SOFTWARE

(75) Inventors: Arthur Berger, Heppenheim (DE); Bettina Jaeger, Heidelberg (DE); Peter Fitz, Waldsee (DE); Karin Brecht-Tillinger, Edingen-Neckarhausen (DE); Arnulf Schueler, Heidelberg (DE); Paola Sala, Heidelberg (DE); Armin Schwarz, Gaiberg (DE); Peter J. Neumayer, Edenkoben (DE); Otfried Von Geisau, Sinsheim (DE); Matthias Tebbe, Walldorf (DE); Jens Freund, Heidelberg (DE); Stefan Kaetkep, Dossenheim (DE); Gerd Moosmann, Pforzheim (DE); Peter Latocha, Malsch (DE)

(73) Assignee: SAP AG, Walldorf (DE)

( * ) Notice: Subject to any disclaimer, the term of this patent is extended or adjusted under 35 U.S.C. 154(b) by 1700 days.

(21) Appl. No.: 11/322,398

(22) Filed: Dec. 30, 2005

(65) Prior Publication Data

US 2007/0156499 A1   Jul. 5, 2007

(51) Int. Cl.
*G06Q 40/00* (2012.01)
(52) U.S. Cl.
USPC ......... 705/7.11; 705/7.26; 717/102; 717/108; 717/116; 717/165; 709/230; 709/246; 719/313
(58) Field of Classification Search
USPC .......................................................... 705/7
See application file for complete search history.

(56) References Cited

U.S. PATENT DOCUMENTS

| | | | |
|---|---|---|---|
| 4,947,321 A | 8/1990 | Spence et al. | |
| 5,361,198 A | 11/1994 | Harmon et al. | |
| 5,550,734 A | 8/1996 | Tarter et al. | |
| 5,560,005 A | 9/1996 | Hoover et al. | |
| 5,566,097 A | 10/1996 | Myers et al. | |
| 5,586,312 A | 12/1996 | Johnson et al. | |
| 5,590,277 A | 12/1996 | Fuchs et al. | |
| 5,632,022 A | 5/1997 | Warren et al. | |

(Continued)

FOREIGN PATENT DOCUMENTS

| WO | WO 00/23874 | * | 4/2000 |
|---|---|---|---|
| WO | WO 2004/083984 | | 9/2004 |
| WO | WO 2005/114381 | | 12/2005 |

OTHER PUBLICATIONS

Anon,; "Sequenst Corp Bell Atlantic: Bell Atlantic Selects Sequent for Video-on-Demand Program; Sequent Moves to Sieze Opportunity in New Market"; Business Wire; Dec. 6, 1994.

(Continued)

*Primary Examiner* — Hani M Kazimi
(74) *Attorney, Agent, or Firm* — Fish & Richardson P.C.

(57) ABSTRACT

Methods, systems, and apparatus, including computer program products, for implementing a software architecture design for a software application implementing self-service procurement used to procure goods and services "ad hoc" by requests from within an organization. The application is structured as multiple process components interacting with each other through service interfaces, and multiple service interface operations, each being implemented for a respective process component. The process components include an Accounting process component, an Internal Request Processing process component, a Purchase Request Processing process component, a Purchase Order Processing process component, a Goods and Service Acknowledgement process component, a Supplier Invoice Processing process component, a Payment Processing process component, an RFQ Processing process component, and a Due Item Processing process component.

16 Claims, 23 Drawing Sheets

(56) References Cited

U.S. PATENT DOCUMENTS

| | | | |
|---|---|---|---|
| 5,634,127 A * | 5/1997 | Cloud et al. | 719/313 |
| 5,680,619 A | 10/1997 | Gudmundson et al. | |
| 5,704,044 A | 12/1997 | Tarter et al. | |
| 5,710,917 A | 1/1998 | Musa et al. | |
| 5,768,119 A | 6/1998 | Havekost et al. | |
| 5,822,585 A | 10/1998 | Nobel et al. | |
| 5,832,218 A | 11/1998 | Gibbs et al. | |
| 5,848,291 A | 12/1998 | Milne et al. | |
| 5,867,495 A | 2/1999 | Elliott et al. | |
| 5,870,588 A | 2/1999 | Rompaey et al. | |
| 5,881,230 A | 3/1999 | Christensen et al. | |
| 5,893,106 A | 4/1999 | Brobst et al. | |
| 5,898,872 A | 4/1999 | Richley | |
| 5,918,219 A | 6/1999 | Isherwood | |
| 5,987,247 A | 11/1999 | Lau | |
| 5,991,536 A | 11/1999 | Brodsky et al. | |
| H001830 H | 1/2000 | Petrimoulx et al. | |
| 6,028,997 A | 2/2000 | Leymann et al. | |
| 6,038,393 A | 3/2000 | Iyengar et al. | |
| 6,049,838 A | 4/2000 | Miller et al. | |
| 6,067,559 A | 5/2000 | Allard et al. | |
| 6,070,197 A | 5/2000 | Cobb et al. | |
| 6,112,024 A | 8/2000 | Almond et al. | |
| 6,151,582 A | 11/2000 | Huang et al. | |
| 6,167,563 A | 12/2000 | Fontana et al. | |
| 6,167,564 A | 12/2000 | Fontana et al. | |
| 6,177,932 B1 | 1/2001 | Galdes et al. | |
| 6,182,133 B1 | 1/2001 | Horvitz | |
| 6,192,390 B1 | 2/2001 | Berger et al. | |
| 6,208,345 B1 | 3/2001 | Sheard et al. | |
| 6,237,136 B1 | 5/2001 | Sadahiro | |
| 6,272,672 B1 | 8/2001 | Conway | |
| 6,311,170 B1 | 10/2001 | Embrey | |
| 6,338,097 B1 | 1/2002 | Krenzke et al. | |
| 6,424,991 B1 | 7/2002 | Gish | |
| 6,434,740 B1 | 8/2002 | Monday et al. | |
| 6,442,748 B1 | 8/2002 | Bowman-Amuah | |
| 6,445,782 B1 | 9/2002 | Elfe et al. | |
| 6,446,045 B1 | 9/2002 | Stone et al. | |
| 6,446,092 B1 | 9/2002 | Sutter | |
| 6,473,794 B1 | 10/2002 | Guheen et al. | |
| 6,493,716 B1 | 12/2002 | Azagury et al. | |
| 6,571,220 B1 | 5/2003 | Ogino et al. | |
| 6,594,535 B1 | 7/2003 | Costanza | |
| 6,601,233 B1 | 7/2003 | Underwood | |
| 6,601,234 B1 | 7/2003 | Bowman-Amuah | |
| 6,606,744 B1 | 8/2003 | Mikurak | |
| 6,609,100 B2 | 8/2003 | Smith et al. | |
| 6,640,238 B1 | 10/2003 | Bowman-Amuah | |
| 6,671,673 B1 | 12/2003 | Baseman et al. | |
| 6,678,882 B1 | 1/2004 | Hurley et al. | |
| 6,687,734 B1 | 2/2004 | Sellink et al. | |
| 6,691,151 B1 | 2/2004 | Cheyer et al. | |
| 6,721,783 B1 | 4/2004 | Blossman et al. | |
| 6,738,964 B1 | 5/2004 | Zink et al. | |
| 6,747,679 B1 | 6/2004 | Finch et al. | |
| 6,750,885 B1 | 6/2004 | Finch et al. | |
| 6,757,837 B1 | 6/2004 | Platt et al. | |
| 6,764,009 B2 | 7/2004 | Melick et al. | |
| 6,772,216 B1 | 8/2004 | Ankireddipally et al. | |
| 6,782,536 B2 | 8/2004 | Moore et al. | |
| 6,789,252 B1 | 9/2004 | Burke et al. | |
| 6,845,499 B2 | 1/2005 | Srivastava et al. | |
| 6,847,854 B2 | 1/2005 | Discenzo | |
| 6,859,931 B1 | 2/2005 | Cheyer et al. | |
| 6,889,197 B2 | 5/2005 | Lidow | |
| 6,889,375 B1 * | 5/2005 | Chan et al. | 717/123 |
| 6,895,438 B1 | 5/2005 | Ulrich | |
| 6,898,783 B1 | 5/2005 | Gupta et al. | |
| 6,904,399 B2 | 6/2005 | Cooper et al. | |
| 6,907,395 B1 | 6/2005 | Hunt et al. | |
| 6,954,736 B2 | 10/2005 | Menninger et al. | |
| 6,985,939 B2 | 1/2006 | Fletcher et al. | |
| 6,990,466 B1 | 1/2006 | Hu | |
| 7,003,474 B2 | 2/2006 | Lidow | |
| 7,031,998 B2 | 4/2006 | Archbold | |
| 7,043,448 B2 | 5/2006 | Campbell | |
| 7,047,518 B2 | 5/2006 | Little et al. | |
| 7,050,056 B2 | 5/2006 | Meyringer | |
| 7,050,873 B1 | 5/2006 | Discenzo | |
| 7,055,136 B2 | 5/2006 | Dzoba et al. | |
| 7,058,587 B1 | 6/2006 | Horne | |
| 7,069,536 B2 | 6/2006 | Yaung | |
| 7,072,855 B1 | 7/2006 | Godlewski et al. | |
| 7,076,766 B2 | 7/2006 | Wirts et al. | |
| 7,100,195 B1 | 8/2006 | Underwood | |
| 7,103,873 B2 | 9/2006 | Tanner et al. | |
| 7,117,447 B2 | 10/2006 | Cobb et al. | |
| 7,120,597 B1 | 10/2006 | Knudtzon et al. | |
| 7,120,896 B2 | 10/2006 | Budhiraja et al. | |
| 7,131,069 B1 | 10/2006 | Rush et al. | |
| 7,149,887 B2 | 12/2006 | Morrison et al. | |
| 7,155,403 B2 | 12/2006 | Cirulli et al. | |
| 7,155,409 B1 | 12/2006 | Stroh | |
| 7,181,694 B2 | 2/2007 | Reiss et al. | |
| 7,184,964 B2 | 2/2007 | Wang | |
| 7,191,740 B2 | 3/2007 | Beringer et al. | |
| 7,194,431 B1 | 3/2007 | Land et al. | |
| 7,197,740 B2 | 3/2007 | Beringer et al. | |
| 7,200,569 B2 | 4/2007 | Gallagher et al. | |
| 7,206,768 B1 | 4/2007 | deGroeve et al. | |
| 7,213,232 B1 | 5/2007 | Knowles | |
| 7,216,091 B1 | 5/2007 | Blandina et al. | |
| 7,219,107 B2 | 5/2007 | Beringer | |
| 7,222,786 B2 | 5/2007 | Renz et al. | |
| 7,225,240 B1 | 5/2007 | Fox et al. | |
| 7,249,044 B2 | 7/2007 | Kumar et al. | |
| 7,257,254 B2 | 8/2007 | Tunney | |
| 7,283,973 B1 | 10/2007 | Loghmani et al. | |
| 7,293,254 B2 | 11/2007 | Bloesch et al. | |
| 7,299,970 B1 | 11/2007 | Ching | |
| 7,315,830 B1 | 1/2008 | Wirtz et al. | |
| 7,322,024 B2 | 1/2008 | Carlson et al. | |
| 7,324,966 B2 | 1/2008 | Scheer | |
| 7,353,180 B1 | 4/2008 | Silverstone et al. | |
| 7,356,492 B2 | 4/2008 | Hazi et al. | |
| 7,367,011 B2 | 4/2008 | Ramsey et al. | |
| 7,370,315 B1 | 5/2008 | Lovell et al. | |
| 7,376,601 B1 | 5/2008 | Aldridge | |
| 7,376,604 B1 | 5/2008 | Butcher | |
| 7,376,632 B1 | 5/2008 | Sadek et al. | |
| 7,383,201 B2 | 6/2008 | Matsuzaki et al. | |
| 7,386,833 B2 | 6/2008 | Granny et al. | |
| 7,406,716 B2 | 7/2008 | Kanamori et al. | |
| 7,415,697 B1 | 8/2008 | Houlding | |
| 7,418,409 B1 | 8/2008 | Goel | |
| 7,418,424 B2 | 8/2008 | Martin et al. | |
| 7,424,701 B2 | 9/2008 | Kendall et al. | |
| 7,433,979 B2 | 10/2008 | Need | |
| 7,448,022 B1 | 11/2008 | Ram et al. | |
| 7,451,432 B2 | 11/2008 | Shukla et al. | |
| 7,460,654 B1 | 12/2008 | Jenkins et al. | |
| 7,461,030 B2 | 12/2008 | Hibler et al. | |
| 7,469,233 B2 | 12/2008 | Shooks et al. | |
| 7,516,088 B2 | 4/2009 | Johnson et al. | |
| 7,523,054 B2 | 4/2009 | Tyson-Quah | |
| 7,529,699 B2 | 5/2009 | Fuse et al. | |
| 7,536,325 B2 | 5/2009 | Randell et al. | |
| 7,536,354 B1 | 5/2009 | deGroeve et al. | |
| 7,546,520 B2 | 6/2009 | Davidson et al. | |
| 7,546,575 B1 | 6/2009 | Dillman et al. | |
| 7,565,640 B2 | 7/2009 | Shukla et al. | |
| 7,574,694 B2 | 8/2009 | Mangan et al. | |
| 7,624,371 B2 | 11/2009 | Kulkarni et al. | |
| 7,631,291 B2 | 12/2009 | Shukla et al. | |
| 7,640,195 B2 | 12/2009 | Von Zimmermann et al. | |
| 7,640,291 B2 | 12/2009 | Maturana et al. | |
| 7,644,390 B2 | 1/2010 | Khodabandehloo et al. | |
| 7,657,406 B2 | 2/2010 | Tolone et al. | |
| 7,657,445 B1 | 2/2010 | Goux | |
| 7,665,083 B2 | 2/2010 | Demant et al. | |
| 7,668,761 B2 | 2/2010 | Jenkins et al. | |
| 7,672,888 B2 | 3/2010 | Allin et al. | |
| 7,681,176 B2 | 3/2010 | Wills et al. | |

(56) References Cited

U.S. PATENT DOCUMENTS

| | | |
|---|---|---|
| 7,693,586 B2 | 4/2010 | Dumas et al. |
| 7,703,073 B2 | 4/2010 | Illowsky et al. |
| 7,739,160 B1 | 6/2010 | Ryan et al. |
| 7,742,985 B1 | 6/2010 | Digrigoli et al. |
| 7,747,980 B2 | 6/2010 | Illowsky et al. |
| 7,765,156 B2 | 7/2010 | Staniar et al. |
| 7,765,521 B2 | 7/2010 | Bryant |
| 7,788,145 B2 | 8/2010 | Wadawadigi et al. |
| 7,788,319 B2 | 8/2010 | Schmidt et al. |
| 7,793,256 B2 | 9/2010 | Charisius et al. |
| 7,793,258 B2 | 9/2010 | Sundararajan et al. |
| 7,797,698 B2 | 9/2010 | Diament et al. |
| 7,814,142 B2 | 10/2010 | Mamou et al. |
| 7,822,682 B2 | 10/2010 | Arnold et al. |
| 7,835,971 B2 | 11/2010 | Stockton et al. |
| 7,886,041 B2 | 2/2011 | Outhred et al. |
| 7,895,568 B1 | 2/2011 | Goodwin et al. |
| 7,904,350 B2 | 3/2011 | Ayala et al. |
| 7,912,755 B2 | 3/2011 | Perry et al. |
| 7,917,889 B2 | 3/2011 | Devarakonda et al. |
| 7,925,985 B2 | 4/2011 | Moore |
| 8,001,519 B2 | 8/2011 | Conallen et al. |
| 8,010,938 B2 | 8/2011 | Elaasar |
| 8,051,332 B2 | 11/2011 | Zakonov et al. |
| 8,091,065 B2 | 1/2012 | Mir et al. |
| 8,112,738 B2 | 2/2012 | Pohl et al. |
| 2001/0052108 A1 | 12/2001 | Bowman-Amuah |
| 2002/0026394 A1 | 2/2002 | Savage et al. |
| 2002/0042756 A1 | 4/2002 | Kumar et al. |
| 2002/0049622 A1 | 4/2002 | Lettich et al. |
| 2002/0073114 A1 | 6/2002 | Nicastro et al. |
| 2002/0078046 A1 | 6/2002 | Uluakar et al. |
| 2002/0082892 A1 | 6/2002 | Raffel et al. |
| 2002/0103660 A1 | 8/2002 | Cramon et al. |
| 2002/0104071 A1 | 8/2002 | Charisius et al. |
| 2002/0107826 A1 | 8/2002 | Ramachandran et al. |
| 2002/0120553 A1 | 8/2002 | Bowman-Amuah |
| 2002/0133368 A1 | 9/2002 | Strutt et al. |
| 2002/0138281 A1 | 9/2002 | Cirulli et al. |
| 2002/0138358 A1 | 9/2002 | Scheer |
| 2002/0143598 A1 | 10/2002 | Scheer |
| 2002/0156695 A1 | 10/2002 | Edwards |
| 2002/0161907 A1 | 10/2002 | Moon |
| 2002/0184111 A1 | 12/2002 | Swanson |
| 2002/0188486 A1 | 12/2002 | Gil et al. |
| 2002/0198798 A1 | 12/2002 | Ludwig et al. |
| 2002/0198828 A1 | 12/2002 | Ludwig et al. |
| 2003/0009754 A1 | 1/2003 | Rowley et al. |
| 2003/0058277 A1 | 3/2003 | Bowman-Amuah |
| 2003/0069774 A1 | 4/2003 | Hoffman et al. |
| 2003/0074271 A1 | 4/2003 | Viswanath et al. |
| 2003/0074360 A1 | 4/2003 | Chen et al. |
| 2003/0083762 A1 | 5/2003 | Farrah et al. |
| 2003/0084127 A1 | 5/2003 | Budhiraja et al. |
| 2003/0130860 A1 | 7/2003 | Datta et al. |
| 2003/0182206 A1* | 9/2003 | Hendrix et al. ................ 705/26 |
| 2003/0212602 A1 | 11/2003 | Schaller |
| 2003/0233290 A1 | 12/2003 | Yang et al. |
| 2004/0015367 A1 | 1/2004 | Nicastro et al. |
| 2004/0034578 A1 | 2/2004 | Oney et al. |
| 2004/0054564 A1 | 3/2004 | Fonseca et al. |
| 2004/0093268 A1 | 5/2004 | Ramchandani et al. |
| 2004/0093381 A1 | 5/2004 | Hodges et al. |
| 2004/0111304 A1 | 6/2004 | Meka et al. |
| 2004/0111639 A1 | 6/2004 | Schwartz et al. |
| 2004/0128180 A1 | 7/2004 | Abel et al. |
| 2004/0133481 A1 | 7/2004 | Schwarze et al. |
| 2004/0153359 A1 | 8/2004 | Ho et al. |
| 2004/0158506 A1 | 8/2004 | Wille |
| 2004/0172510 A1 | 9/2004 | Nagashima et al. |
| 2004/0181470 A1 | 9/2004 | Grounds |
| 2004/0181538 A1 | 9/2004 | Lo et al. |
| 2004/0205011 A1 | 10/2004 | Northington et al. |
| 2004/0236639 A1 | 11/2004 | Candadai et al. |
| 2004/0236687 A1 | 11/2004 | Tyson-Quah |
| 2004/0243489 A1 | 12/2004 | Mitchell et al. |
| 2004/0254866 A1 | 12/2004 | Crumbach et al. |
| 2004/0255152 A1 | 12/2004 | Kanamori et al. |
| 2005/0010501 A1 | 1/2005 | Ward, Jr. |
| 2005/0033588 A1 | 2/2005 | Ruiz et al. |
| 2005/0044015 A1 | 2/2005 | Bracken et al. |
| 2005/0060235 A2 | 3/2005 | Byrne |
| 2005/0060408 A1 | 3/2005 | McIntyre et al. |
| 2005/0065828 A1 | 3/2005 | Kroswek et al. |
| 2005/0108680 A1 | 5/2005 | Cheng et al. |
| 2005/0113092 A1 | 5/2005 | Coppinger et al. |
| 2005/0114829 A1 | 5/2005 | Robin et al. |
| 2005/0125310 A1 | 6/2005 | Hazi et al. |
| 2005/0144125 A1 | 6/2005 | Erbey et al. |
| 2005/0144226 A1 | 6/2005 | Purewal |
| 2005/0156500 A1 | 7/2005 | Birecki et al. |
| 2005/0160104 A1 | 7/2005 | Meera et al. |
| 2005/0165784 A1 | 7/2005 | Gomez et al. |
| 2005/0177435 A1 | 8/2005 | Lidow |
| 2005/0203760 A1 | 9/2005 | Gottumukkala et al. |
| 2005/0203813 A1 | 9/2005 | Welter et al. |
| 2005/0209732 A1 | 9/2005 | Audimoolam et al. |
| 2005/0209943 A1 | 9/2005 | Ballow et al. |
| 2005/0216325 A1 | 9/2005 | Ziad et al. |
| 2005/0216507 A1 | 9/2005 | Wright |
| 2005/0222896 A1 | 10/2005 | Rhyne et al. |
| 2005/0234787 A1 | 10/2005 | Wallmeier et al. |
| 2005/0235020 A1 | 10/2005 | Gabelmann et al. |
| 2005/0240592 A1 | 10/2005 | Mamou et al. |
| 2005/0246250 A1 | 11/2005 | Murray |
| 2005/0246482 A1 | 11/2005 | Gabelmann et al. |
| 2005/0256775 A1 | 11/2005 | Schapler et al. |
| 2005/0256882 A1 | 11/2005 | Able et al. |
| 2005/0257125 A1 | 11/2005 | Roesner et al. |
| 2005/0257197 A1 | 11/2005 | Herter et al. |
| 2005/0262192 A1 | 11/2005 | Mamou et al. |
| 2005/0262453 A1 | 11/2005 | Massasso |
| 2005/0284934 A1 | 12/2005 | Ernesti et al. |
| 2005/0288987 A1 | 12/2005 | Sattler et al. |
| 2005/0289020 A1 | 12/2005 | Bruns et al. |
| 2005/0289079 A1 | 12/2005 | Krishan et al. |
| 2006/0004802 A1 | 1/2006 | Phillips et al. |
| 2006/0053063 A1 | 3/2006 | Nagar |
| 2006/0064344 A1 | 3/2006 | Lidow |
| 2006/0074704 A1 | 4/2006 | Shukla et al. |
| 2006/0074731 A1 | 4/2006 | Green et al. |
| 2006/0080338 A1 | 4/2006 | Seubert et al. |
| 2006/0085243 A1 | 4/2006 | Cooper et al. |
| 2006/0085294 A1 | 4/2006 | Boerner et al. |
| 2006/0085336 A1 | 4/2006 | Seubert et al. |
| 2006/0089886 A1 | 4/2006 | Wong |
| 2006/0095439 A1 | 5/2006 | Buchmann et al. |
| 2006/0129978 A1 | 6/2006 | Abrari et al. |
| 2006/0143029 A1 | 6/2006 | Akbay et al. |
| 2006/0149574 A1 | 7/2006 | Bradley et al. |
| 2006/0206352 A1 | 9/2006 | Pulianda |
| 2006/0248504 A1 | 11/2006 | Hughes |
| 2006/0274720 A1 | 12/2006 | Adams et al. |
| 2006/0287939 A1 | 12/2006 | Harel et al. |
| 2006/0288350 A1 | 12/2006 | Grigorovitch et al. |
| 2007/0011650 A1 | 1/2007 | Hage et al. |
| 2007/0022410 A1 | 1/2007 | Ban et al. |
| 2007/0050308 A1 | 3/2007 | Latvala et al. |
| 2007/0075916 A1 | 4/2007 | Bump et al. |
| 2007/0094098 A1 | 4/2007 | Mayer et al. |
| 2007/0094261 A1 | 4/2007 | Phelan et al. |
| 2007/0129964 A1 | 6/2007 | Helmolt et al. |
| 2007/0129984 A1 | 6/2007 | von Helmolt et al. |
| 2007/0129985 A1 | 6/2007 | Helmolt et al. |
| 2007/0143164 A1 | 6/2007 | Kaila et al. |
| 2007/0150332 A1 | 6/2007 | Grichnik et al. |
| 2007/0150387 A1 | 6/2007 | Seubert et al. |
| 2007/0150855 A1 | 6/2007 | Jeong |
| 2007/0156428 A1 | 7/2007 | Brecht-Tillinger et al. |
| 2007/0156430 A1 | 7/2007 | Kaetker et al. |
| 2007/0156474 A1 | 7/2007 | Scherberger et al. |
| 2007/0156475 A1 | 7/2007 | Berger et al. |
| 2007/0156476 A1 | 7/2007 | Koegler et al. |
| 2007/0156482 A1 | 7/2007 | Bagheri |

(56) References Cited

U.S. PATENT DOCUMENTS

| | | | |
|---|---|---|---|
| 2007/0156489 | A1 | 7/2007 | Berger et al. |
| 2007/0156493 | A1 | 7/2007 | Tebbe et al. |
| 2007/0156499 | A1 | 7/2007 | Berger et al. |
| 2007/0156500 | A1 | 7/2007 | Merkel et al. |
| 2007/0156538 | A1 | 7/2007 | Peter et al. |
| 2007/0156550 | A1 | 7/2007 | Der Emde et al. |
| 2007/0156731 | A1 | 7/2007 | Ben-Zeev |
| 2007/0162893 | A1 | 7/2007 | Moosmann et al. |
| 2007/0164849 | A1 | 7/2007 | Haeberle et al. |
| 2007/0168303 | A1 | 7/2007 | Moosmann et al. |
| 2007/0174068 | A1 | 7/2007 | Alfandary et al. |
| 2007/0174145 | A1 | 7/2007 | Hetzer et al. |
| 2007/0174811 | A1 | 7/2007 | Kaetker et al. |
| 2007/0186209 | A1 | 8/2007 | Kaetker et al. |
| 2007/0197877 | A1 | 8/2007 | Decorte et al. |
| 2007/0198391 | A1 | 8/2007 | Dreyer et al. |
| 2007/0214065 | A1 | 9/2007 | Kahlon et al. |
| 2007/0220046 | A1 | 9/2007 | Moosmann et al. |
| 2007/0220143 | A1 | 9/2007 | Lund et al. |
| 2007/0233539 | A1 | 10/2007 | Suenderhauf et al. |
| 2007/0233541 | A1 | 10/2007 | Schorr et al. |
| 2007/0233545 | A1 | 10/2007 | Cala et al. |
| 2007/0233574 | A1 | 10/2007 | Koegler et al. |
| 2007/0233575 | A1 | 10/2007 | Berger et al. |
| 2007/0233581 | A1 | 10/2007 | Peter |
| 2007/0233598 | A1 | 10/2007 | Der Emde et al. |
| 2007/0234282 | A1 | 10/2007 | Prigge et al. |
| 2007/0239508 | A1 | 10/2007 | Fazal et al. |
| 2007/0239569 | A1 | 10/2007 | Lucas et al. |
| 2007/0265860 | A1 | 11/2007 | Herrmann et al. |
| 2007/0265862 | A1 | 11/2007 | Freund et al. |
| 2008/0004929 | A9 | 1/2008 | Raffel et al. |
| 2008/0017722 | A1 | 1/2008 | Snyder et al. |
| 2008/0027831 | A1 | 1/2008 | Gerhardt |
| 2008/0065437 | A1 | 3/2008 | Dybvig |
| 2008/0120129 | A1 | 5/2008 | Seubert et al. |
| 2008/0147507 | A1 | 6/2008 | Langhammer |
| 2008/0162382 | A1 | 7/2008 | Clayton et al. |
| 2008/0208707 | A1 | 8/2008 | Erbey et al. |
| 2008/0215354 | A1 | 9/2008 | Halverson et al. |
| 2008/0263152 | A1 | 10/2008 | Daniels et al. |
| 2008/0300959 | A1 | 12/2008 | Sinha et al. |
| 2009/0037287 | A1 | 2/2009 | Baitalmal et al. |
| 2009/0037492 | A1 | 2/2009 | Baitalmal et al. |
| 2009/0063112 | A1 | 3/2009 | Hader et al. |
| 2009/0171716 | A1 | 7/2009 | Suenderhauf et al. |
| 2009/0171818 | A1 | 7/2009 | Penning et al. |
| 2009/0172699 | A1 | 7/2009 | Jungkind et al. |
| 2009/0189743 | A1 | 7/2009 | Abraham et al. |
| 2009/0192858 | A1 | 7/2009 | Johnson |
| 2010/0070324 | A1 | 3/2010 | Bock et al. |
| 2010/0070331 | A1 | 3/2010 | Koegler et al. |
| 2010/0070336 | A1 | 3/2010 | Koegler et al. |
| 2010/0070391 | A1 | 3/2010 | Storr et al. |
| 2010/0070395 | A1 | 3/2010 | Elkeles et al. |
| 2010/0070555 | A1 | 3/2010 | Duparc et al. |
| 2010/0100464 | A1 | 4/2010 | Ellis et al. |
| 2010/0138269 | A1 | 6/2010 | Cirpus et al. |
| 2011/0252395 | A1 | 10/2011 | Charisius et al. |

OTHER PUBLICATIONS

Anon.; "State of the Art Reports™ 13,000 MAS 90® for WINDOWS® Shipments in First Nine Months of Availability"; PR Newswire; Apr. 28, 1997.

Avanquest's Bookkeeper 2007 Provides All-in-One Solution for Small Business Accounting and Financial Management; New Version of Popular Software Enables Detailed Report Creation and In-House Payroll Processing; PR Newswire; New York; Oct. 3, 2006.

Avery, S.; "Buyer's Guide to Software for Purchasing 2000.(Directory)"; Purchasing, vol. 129, No. 1; p. 179; Jul. 13, 2000.

"Hudson's Bay Company Realizes Fast ROI with the Oracle E-Business Suite"; PR Newswire; New York; Jan. 15, 2002; p. 1.

International Preliminary Report on Patentability issued in International Application No. PCT/EP2007/002835; Sep. 30, 2008; 8 pages.

Office Action issued in U.S. Appl. No. 11/397,029, filed Jul. 21, 2009; 28 pages.

Office Action issued in U.S. Appl. No. 11/323,040, filed Jul. 24, 2009; 35 pages.

Office Action issued in U.S. Appl. No. 11/323,590, filed Jul. 10, 2009; 32 pages.

Office Action issued in U.S. Appl. No. 11/322,816, filed Jul. 23, 2006; 41 pages.

Office Action issued in U.S. Appl. No. 11/322,851, filed Sep. 2, 2009; 32 pages.

Office Action issued in U.S. Appl. No. 11/323,590, filed Dec. 30, 2009; 31 pages.

Office Action issued in U.S. Appl. No. 11/322,482, filed Jan. 7, 2010; 19 pages.

Office Action issued in U.S. Appl. No. 11/322,772, filed Dec. 9, 2009; 14 pages.

Office Action issued in U.S. Appl. No. 11/323,039, filed Sep. 4, 2009; 36 pages.

Office Action issued in U.S. Appl. No. 11/323,634, filed Sep. 10, 2009; 15 pages.

Office Action issued in U.S. Appl. No. 11/322,383, filed Nov. 12, 2009; 29 pages.

Office Action issued in U.S. Appl. No. 11/396,258, filed Nov. 25, 2009; 9 pages.

Office Action issued in U.S. Appl. No. 12/333,085, filed Jun. 25, 2009; 9 pages.

Office Action issued in U.S. Appl. No. 11/396,288, filed Aug. 19, 2009; 20 pages.

Aleksy, M. et al.; "Interoperability of Java-Based Applications and SAP's Business Framework State of the Art and Desirable Developments"; Proceedings of the International Symposium on Edinburgh, UK; Sep. 1999; IEEE Computer Soc.; pp. 190-200.

Arch-int, S. et al.; "Development of Industrial Information Systems on the Web Using Busienss Components"; Computers in Industry; vol. 60; 2003; pp. 231-250.

Astudillo, H.; "How Conceptual System Architecture Leads to Business Process"; ACM; 2000; pp. 35-36.

Beisiegel, M. et al.; "Service Component Architecture: Building Systems Using a Service Oriented Architecture"; Whitepaper [online]; Nov. 2005; pp. 1-31; http://download.boulder.ibm.com/ibmdl/pub/software/dw/specs/ws-sca/SCA_White_Paper1_09.pdf.

Cowan, D.D. et al.; "Application Integration: Constructing Composite Applications from Interactive Components"; Software Practice and Experience; vol. 23, No. 3; Mar. 1993; pp. 255-275.

Deimel, A.; "The SAP R/3 Business Framework"; Software—Concepts & Tools; vol. 19, No. 1; 1998; pp. 29-36.

Fenner, K.J., et al.; "Classification Framework for Business Components"; System Sciences; Proceedings of the 33rd Annual Hawaii International Conference; Jan. 2000; pp. 3239-3248.

Ferguson D.F. et al.; "Service-Oriented Architecture: Programming Model and Product Architecture"; IBM Systems Journal [online]; vol. 44, No. 4; Dec. 1, 2005; pp. 753-780; http://researchweb.watson.ibm.com/journal/sj/444/ferguson.pdf.

Gauthier, P. and OSS-J Architecture Board; "OSS through Java (TM) J2EE Design Guidelines"; [online]; Oct. 31, 2001; http://www.ossj.org/downloads/design_guidelines.shtml.

Gessford, J.E.; "Object-Oriented System Design"; Emerging Information Technologies for Competitive Advantage and Economic Development; Proceedings of the 1992 Information Resources Management Association International Conference; 1992; pp. 110-118.

He, J. et al.; "Component-Based Software Engineering: The Need to Link Methods and Their Theories"; Theoretical Aspects of Computer ICTAC 2005; Second International Colloquium Proceedings (Lecture notes in Computer Science vol. 3722); Oct. 2005; pp. 70-95.

Kozacynski, W.; "Architecture Framework for Business Components"; Software Reuse 1998 Proceedings; Fifth International Conferences on Victoria, BC, Canada; Jun. 1998; IEEE Comput. Soc; pp. 300-307.

Kythe, D.K.; "The Promise of Distributed Business Components"; Bell Labs Technical Journal; vol. 75, No. 2; Mar./Apr. 1999; pp. 20-28.

(56) References Cited

OTHER PUBLICATIONS

Linthicum, D.S.; "Chapter 9: RPCs, Messaging, and B2B Application Integration"; B2B Application Integration: E-Business Enable Your Enterprise; 2001; pp. 167-181.
Nori A.K. et al.; "Composite Applications: Process Based Application Development"; Lecture Notes in Computer Science; vol. 2444; Aug. 2003; pp. 48-53.
Pilhofer, F.; "Writing and Using CORBA Components"; Apr. 2002; http://www.fpx.de/MicoCCM/download/mico-ccm.pdf; 17 pages.
Ravichandran, T.; "Special Issue on Component-Based Software Development";The Data Base for Advances in Information Systems; 2003; pp. 45-46.
SAP AG; "Designing Cross Solutions"; SAP XAPPS, [online]; Sep. 2003; pp. 1-2; http://www.sap.com/belux/platform/netweaver/pdf/BWP_CAF.pdf.
Schmid, H.A.; "Business Entity Components and Buisness Process Components"; Joop; vol. 12, No. 6; Oct. 1999; pp. 6-10, 12-15.
Sharifi, M. et al.; "CORBA Components Collocation Optimization Enhanced with Local ORB-Like Services Support"; On the Move to Meaningful Internet Systems (2004): COOPIS, ODA and ODBASE. OTM Confederated Conferences COOPIS, DOA and ODBASE 2004; Proceedings Part II (Lecture Notes in Computer Science vol. 3291); 2004; pp. 1143-1154.
Singh, I. et al.; "Designing Enterprise Applications with the J2EE Platform, Second Edition"; Jun. 15, 2002.
Stojanovic, Z. et al.; "Modeling and Design of Service-Oriented Architecture"; Systems, Man and Cybernetics; 2004 IEEE International Conference on The Hague, The Netherlands; Oct. 2004; IEEE, vol. 5; pp. 4147-4152.
Thomas, A.; "Enterprise JavaBeans Server Component Model for Java"; [online]; Dec. 1997; http://www.cs.indiana.edu/classes/b649-gann/ejb-white-paper.pdf.
Vergil Technology Ltd.; "Vergil Composite Application Builder Suite"; Product Datasheet [online]; 2003; pp. 1-5; http://www.webservicesmall.com.docs/VCAB_datasheet.pdf.
Woods, D.; "Packaged Composite Applications: A Liberating Force for the User Interface"; Internet Citation [online]; Oct. 2004; 4 pages; http://www.sapdesignguild.org/editions/edition7/print_compositep_applications.asp.
International Search Report and Written Opinion of the International Searching Authority issued in International Application No. PCT/EP2006/012625; Apr. 3, 2007; 8 pages.
International Preliminary Report on Patentability issued in International Application No. PCT/EP2006/012625; Jul. 1, 2008; 7 pages.
International Search Report and Written Opinion of the International Searching Authority issued in International Application No. PCT/EP2006/012614; Mar. 16, 2007; 7 pages.
International Preliminary Report on Patentability issued in International Application No. PCT/US2006/012614; Jul. 1, 2008; 6 pages.
International Search Report and Written Opinion of the International Searching Authority issued in International Application No. PCT/EP2006/012618; Apr. 3, 2007; 8 pages.
International Preliminary Report on Patentability issued in International Application No. PCT/EP2006/012618; Jul. 1, 2008; 7 pages.
International Search Report and Written Opinion of the International Searching Authority issued in International Application No. PCT/EP2006/012613; May 3, 2007; 6 pages.
International Preliminary Report on Patentability issued in International Application No. PCT/EP2006/012613; Jul. 1, 2008; 6 pages.
International Search Report and Written Opinion of the International Searching Authority issued in International Application No. PCT/EP2006/012624; Mar. 30, 2007; 9 pages.
International Preliminary Report on Patentability issued in International Application No. PCT/EP2006/012624; Jul. 1, 2008; 8 pages.
International Search Report and Written Opinion of the International Searching Authority issued in International Application No. PCT/EP2006/012623; May 7, 2007; 8 pages.
International Preliminary Report on Patentability issued in International Application No. PCT/EP2006/012623; Jul. 1, 2008; 7 pages.
International Search Report and Written Opinion of the International Searching Authority issued in International Application No. PCT/EP2006/012620; Mar. 21, 2007; 7 pages.
International Preliminary Report on Patentability issued in International Application No. PCT/EP2006/012620; Jul. 1, 2008; 6 pages.
International Search Report and Written Opinion of the International Searching Authority issued in International Application No. PCT/EP2006/012619; Apr. 19, 2007; 8 pages.
International Preliminary Report on Patentability issued in International Application No. PCT/EP2006/012619; Jul. 1, 2008; 7 pages.
International Search Report and Written Opinion of the International Searching Authority issued in International Application No. PCT/EP2006/012621; Apr. 19, 2007; 8 pages.
International Preliminary Report on Patentability issued in International Application No. PCT/EP2006/012621; Jul. 1, 2008; 7 pages.
International Search Report and Written Opinion of the International Searching Authority issued in International Application No. PCT/EP2007/002835; Aug. 9, 2007; 12 pages.
Communication Pursuant to Article 94(3) EPC issued in European Application No. 06841224.6; May 15, 2009; 8 pages.
Communication Pursuant to Article 94(3) EPC issued in European Application No. 06847009.5; May 15, 2009; 10 pages.
Communication Pursuant to Article 94(3) EPC issued in European Application No. 07007130.3; Dec. 5, 2008; 6 pages.
Extended European Search Report issued in European Application No. 07007130.3; Oct. 5, 2007; 6 pages.
Office Action issued in U.S. Appl. No. 11/323,041, filed Apr. 30, 2009; 26 pages.
Office Action issued in U.S. Appl. No. 11/322,612, filed May 11, 2009; 24 pages.
Office Action issued in U.S. Appl. No. 11/322,772, filed Mar. 25, 2009; 12 pages.
Office Action issued in U.S. Appl. No. 11/323,590, filed Jan. 9, 2009; 23 pages.
Office Action issued in U.S. Appl. No. 11/396,288, filed Jan. 2, 2009; 18 pages.
Office Action issued in U.S. Appl. No. 11/396,288, filed Apr. 15, 2008; 26 pages.
"American Software Announces ASP Pricing Model for It's a-Applications Expense Business Solution"; PR Newswire; Mar. 6, 2000; 2 pages.
Bastani et al.; "Complex Open System Design by Quasi Agents: Process Oriented Modeling in Agent Based Systems"; ACM SIGSOFT; vol. 34, No. 4; 2009; pp. 1-14.
Bastani et al.; "Process Oriented Abstraction of the Complex Evolvable Systems: Problem Model Construction"; ACM SIGSOFT; vol. 33, No. 3; 2008; pp. 1-13.
"Cendant Announces Comprehensive Online Travel Booking to Meet President Bush's eTravel Initiative"; PR Newswire; Jul. 9, 2002; 3 pages.
Chen, M. and Meixell, M.; "Web Services Enabled Procurement in the Extended Enterprise: An Architectural Design and Implementation"; Journal of Electronic Commerce Research, vol. 4, No. 4; 2003; pp. 140-155.
Duc et al.; "Uniform Object Modeling Methodology and Reuse of Real Time System Using UML"; EMSOFT '05; Sep. 19-22, 2005; pp. 44-47.
Gomaa et al.; "Model Based Software Design and Adaption"; International Workshop on Software Engineering for Adaptive and Self-Managing Systems (SEAMS '07); IEEE; 2007; 10 pages.
Huang, S. et al.; "Computer-Assisted Supply Chain Configuration Based on Supply Chain Operations Reference (SCOR) Model"; Computers & Industrial Engineering 48; 2005; pp. 377-394.
Intuit Canada Ltd.; " Startup Guide—QuickBooks Basic for Windows, QuickBooks Pro for Windows, QuickBooks Premier for Windows"; 2002; 230 pages.
Lambert et al.; "Supply Chain Metrics"; International Journal of Logistics Management; vol. 12, No. 1; 2001; pp. 1-19.
Lockamy III, et al.; "Linking SCOR Planning Practices to Supply Chain Performance"; International Journal of Operationgs & Production Management; vol. 24, No. 12; pp. 1192-1218.

(56) References Cited

OTHER PUBLICATIONS mySAP™ ERP 2005; Downloaded Mar. 24, 2010 from <http://web.archive.org/web/20061104021205/www.sap.com/solutions/business-suite/erp/pdf/BWP_mySAP_ERP_2005.pdf>; 60 pages.

"Oracle Expands E-Commerce Offerings with the Acquisition of E-Travel, Inc."; PR Newswire; Mar. 9, 1999; 3 pages.

Ouyang et al.; "From Business Process Models to Process Oriented Software Systems"; ACM Transactions on Software Engineering and Methodology; vol. 19, No. 1, Article 2; Aug. 2009; pp. 1-37.

Rossi et al.; "Designing and Architecturing Process-aware Web Applications with EPML"; SAC '08; Mar. 16-20, 2008; pp. 2409-2414.

"SAP Delivers Next-generation ERP to Customers"; PR Newswire; New York; Mar. 10, 2005; 7 pages.

Schultz, G.J.;"Keeping SCOR on Your Supply Chain: Basic Operations Reference Model Updates with the Times"; Information Strategy: The Executive's Journal; Summer 2003; pp. 12-20.

Stephens, S.; "Supply Chain Council & Supply Chain Operations Reference (SCOR) Model Overview"; <http://www.supply-chain.org>; Version 5.0a; Aug. 2001; 29 pages.

Stephens, S.; "Supply Chain Operatives Reference Model Version 5.0: A New Tool to Improve Supply Chain Efficiency and Achieve Best Practice"; Information Systems Frontiers 3:4, 2001; pp. 471-476.

"Time Management with mySAP™ ERP Human Capital Management"; Downloaded Mar. 24, 2010 from <http://web.archive.org/web/20060105084834/www.sap.com/solutions/business-suite/erp/hcm/pdf/HCM_TimeManagement.pdf>; 4 pages.

Vogel et al.; "mySAP ERP for Dummies"; Published on Sep. 30, 2005; Downloaded on Mar. 23, 2001 from <http://proquest.safaribooksonline.com/9780764599958> 41 pages.

International Search Report and Written Opinion of the International Searching Authority issued in International Application No. PCT/EP2007/002841; Aug. 16, 2007; 12 pages.

International Preliminary Report on Patentability under Chapter I issued in International Application No. PCT/EP2007/002841; Sep. 30, 2008; 8 pages.

Office Action issued in U.S. Appl. No. 11/396,312, filed Mar. 30, 2010; 23 pages.

Office Action issued in U.S. Appl. No. 11/322,611, filed Mar. 31, 2010; 17 pages.

Notice of Allowance issued in U.S. Appl. No. 11/322,610, filed Mar. 1, 2010; 12 pages.

Notice of Allowance issued in U.S. Appl. No. 11/322,610, filed Jun. 14, 2010; 6 pages.

Office Action issued in U.S. Appl. No. 11/322,383, filed May 12, 2010; 23 pages.

Office Action issued in U.S. Appl. No. 11/322,382, filed Mar. 29, 2010; 28 pages.

Office Action issued in U.S. Appl. No. 11/323,041, filed Mar. 19, 2010; 26 pages.

Advisory Action issued in U.S. Appl. No. 11/323,041, filed Jun. 7, 2010; 3 pages.

Notice of Allowance issued in U.S. Appl. No. 11/396,259, filed Mar. 29, 2010; 19 pages.

Notice of Allowance issued in U.S. Appl. No. 11/396,288, filed May 20, 2010; 15 pages.

Notice of Allowance issued in U.S. Appl. No. 11/396,258, filed Mar. 31, 2010; 9 pages.

Supplemental Notice of Allowance issued in U.S. Appl. No. 11/396,258, filed May 19, 2010; 8 pages.

Office Action issued in U.S. Appl. No. 11/396,236, filed Mar. 31, 2010; 20 pages.

Office Action issued in U.S. Appl. No. 11/323,039, filed Apr. 14, 2010; 15 pages.

Office Action issued in U.S. Appl. No. 11/322,851, filed May 12, 2010; 15 pages.

Office Action issued in U.S. Appl. No. 11/323,040, filed Apr. 29, 2010; 17 pages.

Office Action issued in U.S. Appl. No. 11/322,612, filed Apr. 1, 2010; 23 pages.

Advisory Action issued in U.S. Appl. No. 11/322,612, filed Jun. 24, 2010; 3 pages.

Notice of Allowance issued in U.S. Appl. No. 11/397,026, filed Mar. 29, 2010; 17 pages.

Notice of Allowance issued in U.S. Appl. No. 12/233,554, filed May 14, 2010; 11 pages.

Notice of Allowance issued in U.S. Appl. No. 12/233,534, filed Jun. 24, 2010; 15 pages.

Notice of Allowance issued in U.S. Appl. No. 12/327,354, filed Jun. 25, 2010; 16 pages.

Notice of Allowance issued in U.S. Appl. No. 11/967,865, filed Mar. 31, 2010; 16 pages.

Office Action issued in U.S. Appl. No. 11/323,590, filed Jun. 21, 2010; 25 pages.

Office Action issued in U.S. Appl. No. 11/323,634, filed Apr. 2, 2010; 9 pages.

Office Action issued in U.S. Appl. No. 11/322,816, filed Apr. 15, 2010; 27 pages.

Office Action issued in U.S. Appl. No. 11/396,327, filed Apr. 1, 2010; 26 pages.

Office Action issued in U.S. Appl. No. 12/333,085, filed Mar. 23, 2010; 5 pages.

Office Action issued in U.S. Appl. No. 11/322,772, filed Jul. 12, 2010; 18 pages.

Notice of Allowance issued in U.S. Appl. No. 11/396,259, filed Jul. 6, 2010; 6 pages.

Supplemental Notice of Allowance issued in U.S. Appl. No. 11/397,026, filed Jul. 9, 2010; 4 pages.

Notice of Allowance issued in U.S. Appl. No. 11/322,482, filed Jul. 13, 2010; 5 pages.

Cascallar, Eduardo et al.; "Assessment in the Evaluation of Self-Regulation as a Process"; Educational Psychology Review; vol. 18, No. 3; Sep. 2006; pp. 297-306.

Cool, David W.; "Activity Fund Accounting"; School Business Affairs; vol. 49, No. 6; Jun. 1983; pp. 50-52.

Office Action issued in U.S. Appl. No. 11/396,312 on Sep. 10, 2010; 23 pages.

Office Action issued in U.S. Appl. No. 11/322,611 on Sep. 16, 2010; 21 pages.

Notice of Allowance issued in U.S. Appl. No. 11/322,610 on Sep. 23, 2010; 6 pages.

Notice of Allowance issued in U.S. Appl. No. 11/322,382 on Sep. 20, 2010; 6 pages.

Notice of Allowance issued in U.S. Appl. No. 11/396,259 on Oct. 15, 2010; 6 pages.

Notice of Allowance issued in U.S. Appl. No. 11/396,288; Sep. 24, 2010; 4 pages.

Office Action issued in U.S. Appl. No. 11/396,250 on Oct. 18, 2010; 15 pages.

Notice of Allowance issued in U.S. Appl. No. 11/396,258 on Jul. 28, 2010; 9 pages.

Office Action issued in U.S. Appl. No. 11/322,845; Jul. 15, 2010; 16 pages.

Notice of Allowance issued in U.S. Appl. No. 11/397,026 on Jul. 26, 2010; 6 pages.

Notice of Allowance issued in U.S. Appl. No. 12/233,554 on Sep. 17, 2010; 10 pages.

Notice of Allowance issued in U.S. Appl. No. 11/968,054 on Sep. 7, 2010; 11 pages.

Office Action issued in U.S. Appl. No. 12/233,557 on Sep. 16, 2010; 16 pages.

Notice of Allowance issued in U.S. Appl. No. 12/233,534 on Oct. 20, 2010; 15 pages.

Notice of Allowance issued in U.S. Appl. No. 12/327,354 on Oct. 18, 2010; 16 pages.

Notice of Allowance issued in U.S. Appl. No. 11/967,865 on Oct. 6, 2010; 6 pages.

Office Action issued in U.S. Appl. No. 11/967,483; Aug. 20, 2010; 10 pages.

Notice of Allowance issued in U.S. Appl. No. 12/333,085; Sep. 13, 2010; 8 pages.

(56) References Cited

OTHER PUBLICATIONS

Ferscha et al.; "A Light-Weight Component Model for Peer-to-Peer Applications"; IEEE; Mar. 23, 2004. 9pgs.
Flissi et al.; "A Component-based Software Infrastructure for Ubiquitous Computing"; IEEE; Jul. 4, 2005. 8pgs.
Gould; "Integrating the Manufacturing Enterprise"; Automative Design & Production; 119, 1; ABI/INFORM Global; Jan. 2007; 3 pages.
Papazoglou et al; "Service-Oriented Computing Research Road Map"; http://infolab.uvt.nl/pub/papazogloump-2006-96.pdf; Mar. 1, 2006; 29 pages.
SAP AG; "SAP NetWeaver Visual Composer: User Guide (SAP NetWeaver Visual Composer release 6.0)"; Document version 1.1; pp. 1-208. Jul. 9, 2004.
SAP AG; "Powered by SAP NetWeaver Partner Program—Frequently Asked Questions"; May 2005; 10 pages [online] http://www.lionbridge.com/NR/rdonlyres/4940BE1F/DA46/412E/AB16/F049BD865CA1/0/PBMW FAQ__50070686__en.pdf.
Strelich, Thomas P. et al.; "Simulation-Based Transformation with the Service Integration/Interoperation Infrastructure"; Technology Review Journal; Fall/Winter 2005; pp. 99-115.
Notice of Allowance issued in U.S. Appl. No. 11/322,610 on Dec. 22, 2010; 6 pages.
Notice of Allowance issued in U.S. Appl. No. 1/322,382 on Jan. 6, 2011; 7 pages.
Notice of Allowance issued in U.S. Appl. No. 11/396,259 on Jan. 20, 2011; 6 pages.
Notice of Allowance issued in U.S. Appl. No. 11/396,288; Dec. 28, 2010; 4 pages.
Notice of Allowance issued in U.S. Appl. No. 11/396,258 on Nov. 16, 2010; 8 pages.
Office Action issued in U.S. Appl. No. 11/396,236 on Oct. 28, 2010; 19 pages.
Notice of Allowance issued in U.S. Appl. No. 11/322,845; Dec. 27, 2010; 16 pages.
Office Action issued in U.S. Appl. No. 11/323,040 on Nov. 5, 2010; 33 pages.
Notice of Allowance issued in U.S. Appl. No. 11/397,026 on Nov. 15, 2010; 7 pages.
Office Action issued in U.S. Appl. No. 12/233,550 on Jan. 12, 2011; 29 pages.
Notice of Allowance issued in U.S. Appl. No. 12/233,534 on Jan. 31, 2011; 15 pages.
Notice of Allowance issued in U.S. Appl. No. 12/327,354 on Feb. 1, 2011; 16 pages.
Office Action issued in U.S. Appl. No. 11/322,973 on Dec. 7, 2010; 13 pages.
Notice of Allowance issued in U.S. Appl. No. 11/396,327 on Nov. 30, 2010; 28 pages.
Office Action issued in U.S. Appl. No. 11/404,147 on Nov. 24, 2010; 27 pages.
Notice of Allowance issued in U.S. Appl. No. 12/233,462 on Feb. 2, 2011; 11 pages.
Bin et al.; "Component Model Optimization for Distributed Real-Time Embedded Software"; IEEE International Conference on Systems, Man and Cybernetics; Oct. 13, 2004; 6 pages.
Cohen; "Optimizer: IBM's Multi-Echelon Inventory System for Managing Service Logistics Interfaces"; vol. 20, No. 1; 1990; pp. 65-82.
Cohen et al.; "Saturn's Supply-Chain Innovation: High Value in After Sales Service"; Sloan Management Review; vol. 41, No. 4; 2000; pp. 93-101.
Cox et al.; "A Formal Model for Component Based Software"; IEEE; Aug. 7, 2002; 8 pages.
Finin et al.; "KQML as an Agent Communication Language"; retrieved on Jul. 26, 2011; pp. 456-463. <http://portal.acm.org/citation.cfm?id=191322>.
Jennings et al.; "Autonomous Agents for Business Process Management"; 2000 Applied Artificial Intelligence; retrieved on Jul. 25, 2011; pp. 145-189. <http://citeseerx.ist.psu.edu/viewdoc/download?doi=10.1.1.58.624&rep=rep1&1type=pdf>.
Kalakota et al.; "Readings in Electronic Commerce"; Addison-Wesley Longman, Inc.; 1995; ISBN: 0-201-88060-1.
Orsburn; "Spares Management Handbook"; McGrawHill; 1991; ISBN: 0-8306-7626-0.
Notice of Allowance issued in U.S. Appl. No. 12/233,554 on Feb. 22, 2011; 7 pages.
Notice of Allowance issued in U.S. Appl. No. 12/233,554 on Jun. 27, 2011; 7 pages.
Notice of Allowance issued in U.S. Appl. No. 12/233,550 on May 11, 2011; 20 pages.
Office Action issued in U.S. Appl. No. 11/323,634 on Apr. 29, 2011; 8 pages.
Office Action issued in U.S. Appl. No. 11/322,973 on May 27, 2011; 15 pages.
Office Action issued in U.S. Appl. No. 11/404,147 on Aug. 4, 2011; 26 pages.
Notice of Allowance issued in U.S. Appl. No. 12/233,462 on May 18, 2011; 6 pages.
Office Action issued in U.S. Appl. No. 12/233,457 on May 26, 2011; 19 pages.
Office Action issued in U.S. Appl. No. 11/967,483 on Mar. 4, 2011; 6 pages.
Office Action issued in U.S. Appl. No. 12/327,232 on May 26, 2011; 20 pages.
Office Action issued in U.S. Appl. No. 12/327,590 on Jun. 23, 2011; 16 pages.
Notice of Allowance issued in U.S. Appl. No. 12/233,534 on May 16, 2011; 12 pages.
Notice of Allowance issued in U.S. Appl. No. 11/322,610 on Mar. 31, 2011; 6 pages.
Notice of Allowance issued in U.S. Appl. No. 11/396,250 on Mar. 2, 2011; 13 pages.
Notice of Allowance issued in U.S. Appl. No. 11/396,250 on Jun. 24, 2011; 5 pages.
Notice of Allowance issued in U.S. Appl. No. 11/396,258 on Jun. 28, 2011; 9 pages.
Notice of Allowance issued in U.S. Appl. No. 11/322,845; Apr. 8, 2011; 8 pages.
Office Action issued in U.S. Appl. No. 11/323,040 on Jul. 26, 2011; 34 pages.
Notice of Allowance issued in U.S. Appl. No. 11/397,026 on Mar. 3, 2011; 6 pages.
Office Action issued in U.S. Appl. No. 12/233,417 on Apr. 7, 2011; 32 pages.
Office Action issued in U.S. Appl. No. 12/233,530 on Apr. 29, 2011; 11 pages.
Office Action issued in U.S. Appl. No. 11/967,405 on Apr. 27, 2011; 15 pages.
Office Action issued in U.S. Appl. No. 12/233,557 on Mar. 4, 2011; 19 pages.
Office Action issued in U.S. Appl. No. 12/233,489 on May 13, 2011; 15 pages.
Office Action issued in U.S. Appl. No. 11/967,393 on Apr. 15, 2011; 12 pages.
Office Action issued in U.S. Appl. No. 12/233,075 on Aug. 4, 2011; 45 pages.
Notice of Allowance issued in U.S. Appl. No. 11/967,865 on Jun. 24, 2011; 8 pages.
Anonymous; "Mastering Management", Motor Age, vol. 25, No. 10; Oct. 2006; pp. 1-3.
Gerin et al.; "Flexible and Executable Hardware/Software Interface Modeling for Multiprocessor SOC Design Using SystemC"; IEEE; 2007; pp. 390-395.
Hahn; "A Domain Specific Modeling Language for Multi-Agent Systems"; ACM AAMAS; 2008; pp. 233-240.
Hu; "A Co-Design Modeling Approach for Computer Network Systems"; IEEE; 2007; pp. 685-693.
Kremic, Tibor; "Outsourcing Decision Support: A Survey of Benefits, Risks, and Decision Factor"; Supply Chain Management; V. 11; 2006; pp. 467-482.

(56) References Cited

OTHER PUBLICATIONS

Sarjoughian et al.; "CoSMOs: A Visual Environment for Component Based Modeling, Experimental Design and Simulation"; ACM; 2009; pp. 1-9.
Schaub, Thomas et al.; "Enterprise Management Application Providing Availability Control Checks on Revenue Budgets"; Aerospace & High Technology, ANTE: Abstracts in New Technologies and Engineering; Metdex, Mechanical & Transportation Engineering Abstracts; Date Unknown, p. 1.
Veseovi, Marcos and Hagmann, Christian; "Rules Engine for Enterprise System"; Areospace & High Technology, ANTE: Abstracts in New Technologies and Engineering; Metadex, Mechanical & Transportation Engineering Abstracts; Date Unknown; p. 1.
Office Action issued in U.S. Appl. No. 12/333,146 on Sep. 6, 2011; 21 pages.
Notice of Allowance issued in U.S. Appl. No. 11/396,327 on Sep. 28, 2011; 31 pages.
Office Action issued in U.S. Appl. No. 12/233,479 on Oct. 27, 2011; 24 pages.
Office Action issued in U.S. Appl. No. 12/332,965 on Oct. 11, 2011; 6 pages.
Notice of Allowance in issued in U.S. Appl. No. 12/233,462 on Sep. 2, 2011; 7 pages.
Notice of Allowance in U.S. Appl. No. 12/233,462 on Dec. 12, 2011; 6 pages.
Office Action issued in U.S. Appl. No. 12/233,289 on Oct. 27, 2011; 15 pages.
Notice of Allowance issued in U.S. Appl. No. 12/233,457 on Novernber 3, 2011; 12 pages.
Notice of Allowance issued in U.S. Appl. No. 12/327,232 on Nov. 2, 2011; 16 pages.
Office Action issued in U.S. Appl. No. 12/327,701 on Nov. 8, 2011; 20 pages.
Office Action issued in U.S. Appl. No. 12/233,087 on Aug. 18, 2011; 42 pages.
Notice of Allowance issued in U.S. Appl. No. 11/322,382 on Jul. 25, 2011; 5 pages.
Office Action issued in U.S. Appl. No. 11/322,383 on May 12, 2010; 23 pages.
Office Action issued in U.S. Appl. No. 11/322,383 on Nov. 12, 2009; 23 pages.
Examiner's Answer to Appeal Brief issued in U.S. Appl. No. 11/396,236 on Nov. 10, 2011; 19 pages.
Notice of Allowance issued in U.S. Appl. No. 11/396,259 on Aug. 5, 2011; 7 pages.
Office Action issued in U.S. Appl. No. 11/396,288 on Oct. 17, 2011; 38 pages.
Notice of Allowance issued in U.S. Appl. No. 11/396,250 on Dec. 7, 2011; 6 pages.
Office Action issued in U.S. Appl. No. 11/396,252 on Nov. 10, 2011; 18 pages.
Notice of Allowance issued in U.S. Appl. No. 11/322,851 on Sep. 2, 2011; 8 pages.
Notice of Allowance issued in U.S. Appl. No. 11/322,845; Nov. 13, 2011; 9 pages.
Office Action issued in U.S. Appl. No. 11/397,026; Jul. 21 2009; 28 pages.
Notice of Allowance issued in U.S. Appl. No. 11/397,026 on Jul. 20, 2011; 8 pages.
Notice of Allowance issued in U.S. Appl. No. 11/397,026 on Nov. 4, 2011; 8 pages.
Notice of Allowance issued in U.S. Appl. No. 12/233,520 on Nov. 10, 2011; 22 pages.
Notice of Allowance issued in U.S. Appl. No. 12/233,417 on Sep. 14, 2011; 11 pages.
Notice of Allowance issued in U.S. Appl. No. 11/968,054 on Aug. 2, 2011; 5 pages.
Office Action issued in U.S. Appl. No. 12/233,458 on Oct. 12, 2011; 19 pages.
Office Action issued in U.S. Appl. No. 11/967,489 on Sep. 28, 2011; 7 pages.
Notice of Allowance issued in U.S. Appl. No. 11/967,393 on Nov. 9, 2011; 9 pages.
Notice of Allowance issued in U.S. Appl. No. 12/327,354 on Aug. 9, 2011; 13 pages.
Office Action issued in U.S. Appl. No. 11/967,387 on Sep. 8, 2011; 14 pages.
Notice of Allowance issued in U.S. Appl. No. 11/967,890 on Jul. 15, 2011; 7 pages.
"IDe Partners with Journyx to Offer Customers Best-in-Class Time Management Solution"; PR Newswire; Mar. 8, 2005; Business Dateline.
Meseroll, Robert; "Data Mining Navy Flight"; IEEE Autotestcom 2007; Sep. 2007; pp. 476-481.
"Trakware Systems Inc. Expands Management Team: Leading To-Order Software Provider Adds Experienced Global VP Sales and Marketing to its World-Class Team"; Canada NewsWire; Apr. 9, 2008.
Trappey, Amy; "Design and Analysis of a Rule Based Knowledge"; International Journal of Manufacturing Tech; Dec. 2007; 35,3-4:385-93.
Notice of Allowance issued in U.S. Appl. No. 12/233,550 on Jan. 9, 2012; 11 pages.
Office Action issued in U.S. Appl. No. 12/333,146 on Feb. 2, 2012; 21 pages.
Notice of Allowance issued in U.S. Appl. No. 11/323,634 on Jan. 25, 2012; 5 pages.
Office Action issued in U.S. Appl. No. 12/233,479 on May 7, 2012; 26 pages.
Notice of Allowance issued in U.S. Appl. No. 12/332,965 on Jun. 11, 2012; 21 pages.
Notice of Allowance in U.S. Appl. No. 12/233,462 on Apr. 5, 2012; 7 pages.
Notice of Allowance issued in U.S. Appl. No. 12/233,289 on Feb. 15, 2012; 11 pages.
Notice of Allowance issued in U.S. Appl. No. 12/327,590 on Dec. 28, 2011; 10 pages.
Notice of Allowance issued in U.S. Appl. No. 12/327,701 on Apr. 6, 2012; 9 pages.
Notice of Allowance issued in U.S. Appl. No. 12/233,087 on Mar. 30, 2012; 30 pages.
Notice of Allowance issued in U.S. Appl. No. 12/233,534 won Dec. 28, 2011; 7 pages.
Notice of Allowance issued in U.S. Appl. No. 11/396,259 on Mar. 15, 2012; 7 pages.
Notice of Allowance issued in U.S. Appl. No. 11/396,258 on Feb. 3, 2012; 12 pages.
Notice of Allowance issued in U.S. Appl. No. 11/322,851 on Mar. 1, 2012; 9 pages.
Notice of Allowance issued in U.S. Appl. No. 11/397,026 on Feb. 23, 2012; 8 pages.
Notice of Allowance issued in U.S. Appl. No. 12/233,458 on May 1, 2012; 17 pages.
Office Action issued in U.S. Appl. No. 11/967,489 on Feb. 6, 2012; 9 pages.
Office Action issued in U.S. Appl. No. 11/967,387 on Apr. 12, 2012; 13 pages.
Office Action issued in U.S. Appl. No. 12/327,737 on Mar. 26, 2012; 14 pages.
Notice of Allowance issued in U.S. Appl. No. 12/233,075 on Mar. 22, 2012; 25 pages.

\* cited by examiner

ARCHITECTURAL DESIGN FOR SELF-SERVICE PROCUREMENT APPLICATION SOFTWARE

BACKGROUND

The subject matter of this patent applications relates to computer software architecture, and more particularly to the architecture of application software for self-service procurement.

Enterprise software systems are generally large and complex. Such systems can require many different components, distributed across many different hardware platforms, possibly in several different geographical locations. Thus, the architecture of a large software application, i.e., what its components are and how they fit together, is an important aspect of its design for a successful implementation.

SUMMARY

This specification presents a software architecture design for a software application implementing self-service procurement.

The invention can be implemented as methods, systems, and apparatus, including computer program products, for implementing a software architecture design for a software application implementing self-service procurement used to procure goods and services "ad hoc" by requests from within an organization. The application is structured as multiple process components interacting with each other through service interfaces, and multiple service interface operations, each being implemented for a respective process component. The process components include an Accounting process component, an Internal Request Processing process component, a Purchase Request Processing process component, a Purchase Order Processing process component, a Goods and Service Acknowledgement process component, a Supplier Invoice Processing process component, a Payment Processing process component, an RFQ Processing process component, and a Due Item Processing process component.

The invention can further be implemented as methods, systems, and apparatus, including computer program products, implementing a software architecture design for a software application that is adapted to interact with external software systems through the service operations described in reference to external process components, or a subcombination of them.

The subject matter described in this specification can be implemented to realize one or more of the following advantages. Effective use is made of process components as units of software reuse, to provide a design that can be implemented reliably in a cost effective way. Effective use is made of deployment units, each of which is deployable on a separate computer hardware platform independent of every other deployment unit, to provide a scalable design. Service interfaces of the process components define a pair-wise interaction between pairs of process components that are in different deployment units in a scalable way.

Details of one or more implementations of the subject matter described in this specification are set forth in the accompanying drawings and in the description below. Further features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
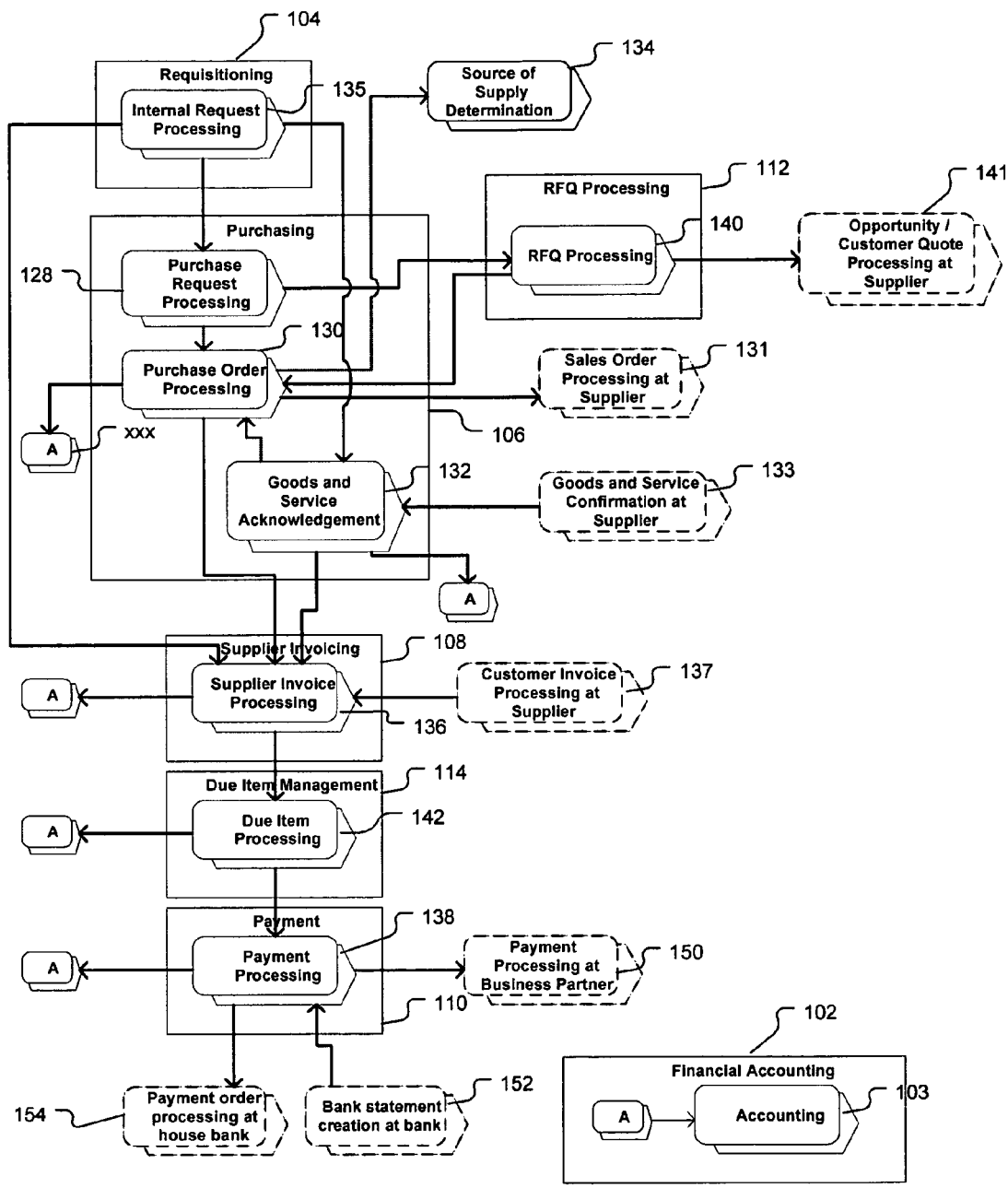
FIG. 1 is a block diagram of a software architectural design for a self-service procurement software application.

FIG. 1 shows the software architectural design for a self-service procurement software application. The self-service procurement application is software that implements an end-to-end process used to procure goods and services "ad hoc" by requests from within an organization.

As shown in FIG. 1, the self-service procurement design includes seven deployment units: a Financial Accounting deployment unit 102, a Requisitioning deployment unit 104, a Purchasing deployment unit 106, a Supplier Invoicing deployment unit 108, a Payment deployment unit 110, an RFQ Processing deployment unit 112, and a Due Item Management deployment unit 114.

The Financial Accounting deployment unit 102 contains an Accounting process component 103 that records all relevant business transactions. The Requisitioning deployment unit 104 includes an Internal Request Processing process component 135 to process internal request.

The Purchasing deployment unit 106 includes three process components: a Purchase Request Processing process component 128, a Purchase Order Processing process component 130, and a Goods and Service Acknowledgement process component 132.

The Purchase Request Processing process component 128 provides a request or instruction to the purchasing department to purchase specified goods or services in specified quantities within a specified time.

The Purchase Order Processing process component 130 includes a purchase order business object and a purchase order confirmation business object. The purchase order business object is a request from a purchaser to an external supplier to deliver a specified quantity of goods, or perform a specified service within a specified time. The purchase order confirmation business object is a communication from a supplier to a purchaser to advise that a purchase order has been received. In particular, a purchase order confirmation may advise that the purchaser of the supplier is accepting the purchase order, or the supplier proposing has made changes to the purchase order, or the supplier is not accepting the purchase order.

The Goods and Service Acknowledgement process component 132 includes a Goods and Service Acknowledgement business object. The Goods and Service Acknowledgement business object is a document that states the recipient's obligation, for example, a purchaser's obligation, to pay the supplier for goods received or services rendered. An invoice is normally created after the goods and service acknowledgement has been confirmed.

The Supplier Invoicing deployment unit 108 includes a Supplier Invoice Processing process component 136. The Supplier Invoice Processing process component 136 includes a supplier invoice business object and a supplier invoice request business object. The supplier invoice business object is a document that states the recipient's obligation to pay the supplier for goods received or services rendered. The invoice may be created after the goods and service acknowledgment has been confirmed. The supplier invoice request business object is a document that is sent to invoice verification, advising that an invoice for specified quantities and prices is expected and may be created through evaluation settlement. The system uses the invoice request as a basis for invoice verification, as well as for the automatic creation of the invoice.

The Payment deployment unit 110 includes a Payment Process component 138. The Payment Processing process component 138 is used to handle all incoming and outgoing payments as well as represent the main database for a liquidity status.

The RFQ Processing deployment unit 112 includes an RFQ Processing process component 140. The RFQ Processing deployment unit process component 140 includes a Request for Response business object and a Quote business object handles requests for quotation and corresponding quotes. The A request for quotation (RFQ) is a description of materials and services that purchasers use to request responses from potential suppliers. Requests for Quotation can be one of the following a number of types, including: a request for (price) information, a request for quote that may run over a certain period of time, a request for proposal in complex purchasing situation or live auctions that may be performed over a short time frame. The A quote is a response to a request for quotation in which a supplier offers to sell goods and services at a certain price. The quote can be subject to complex pricing and conditions.

The Due Item Management deployment unit 114 includes a Due Item Processing process component 142. The Due Item Processing process component 142 is used to manage all payables, receivables from service and supply and corresponding sales including a withholding tax.

The foundation layer, described below, includes a Source of Supply Determination process component 134.

The Source of Supply Determination process component 134 uses two business objects to determine a source of supply: a supply quota arrangement business object, and a source of supply business object. The supply quota arrangement business object is a distribution of material requirements or goods to different sources of supply, business partners, or organizational units within a company. An example of the use of the supply quota arrangements business object is the distribution of material requirements between in-house production and different sources for external procurement. The supply quota arrangement business object can also define the distribution of goods to customers in case of excess production or shortages. The source of supply business object is an object that describes a logical link between a possible source of products and a possible target.

A number of external process components, described below, will be used to describe the architectural design: a Sales Order Processing at Supplier process component 131, a Goods and Service Confirmation at Supplier process component 133, a Customer Invoice Processing at Supplier process component 137, an Opportunity/Customer Quote Processing at Supplier process component 141, a Payment Processing at Business Partner process component 150, a Bank statement creation at bank process component 152, and a Payment order processing at house bank process component 154.

The Purchase Order Processing process component 130 may send messages to a Sales Order Processing at Supplier process component 131. The Sales Order Processing at Supplier process component 131 handles customers' requests to a company for delivery of goods or services at a certain time. The requests are received by a sales area, which is then responsible for fulfilling the contract.

The Goods and Service Acknowledgement process component 132 may receive messages from a Goods and Service Confirmation at Supplier process component 133. The Goods and Service Confirmation at Supplier process component 133 may serve to confirm orders of goods and services at the supplier.

The Supplier Invoicing deployment unit 108 receives messages from a Customer Invoice Processing at Supplier processing component 137, which is used, at supplier, to charge a customer for the delivery of goods or services.

The RFQ Processing process component 140 may send messages to an Opportunity/Customer Quote Processing at Supplier process component 141. A Customer Quote Processing process component is used to offer to a customer for the delivery of goods or services according to fixed terms. The offer legally binds the company for a certain period of time. An Opportunity Processing process component is used to handle recognized possibilities for sales of products or services. An opportunity can result from a trade fair, a sales deal or a bid invitation. It summarizes a variety of business information such as the expected sales revenue or expected net value.

As shown in FIG. 1, the Payment Processing at Business Partner process component 150, the Bank statement creation at bank process component 152, and the Payment order processing at house bank process component 154 may interact with the Payment Processing process component 138. The Payment Processing Process component 138 may send updates to a Payment Processing at Business Partner processing component 150, which is used to handle, at business partner, all incoming and outgoing payments and represent the main database for the liquidity status. The Payment Processing Process component 138 also receives messages from the Bank statement creation at bank process component 152. The message may include a bank Statement for a bank account. The Payment Processing Process component 138 sends messages to the Payment order processing at house bank process component 154. The message may include a Bank Payment Order that is a Payment Order, which will be sent to a house bank. The bank payment order may contain bank transfers as well direct debits.

Figure 2:
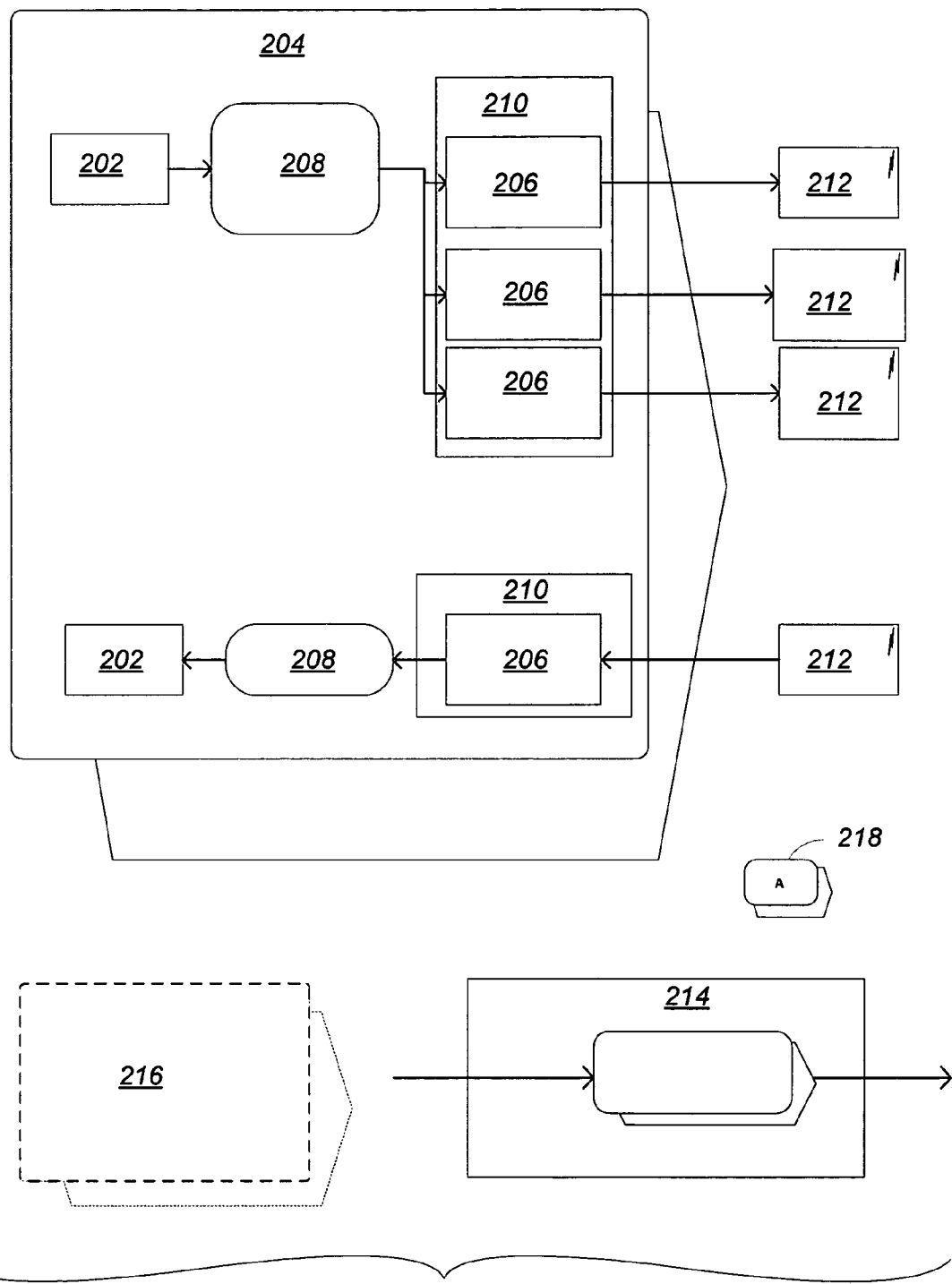
FIG. 2 illustrates the elements of the architecture as they are drawn in the figures of this patent application.

FIG. 2 illustrates the elements of the architecture as they are drawn in the figures of this patent application. The elements of the architecture include the business object (drawn as icon 202), the process component (drawn as icon 204), the operation (drawn as icon 206), the process agent (drawn as icon 208), the service interface or interface (drawn as icon 210), the message (drawn as icon 212), and the deployment unit (drawn as icon 214).

Not explicitly represented in the figures is a foundation layer that contains all fundamental entities that are used in multiple deployment units. These entities can be process components, business objects and reuse service components. A reuse service component is a piece of software that is reused in different transactions. A reuse service component is used by its defined interfaces, which can be local APIs (Application Programming Interfaces) or service interfaces.

In contrast to a deployment unit, the foundation layer does not define a limit for application-defined transactions. Deployment units communicate directly with entities in the foundation layer, which communication is typically not message based. The foundation layer is active in every system instance on which the application is deployed. Business objects in the foundation layer will generally be master data objects. In addition, the foundation layer will include some business process objects that are used by multiple deployment units. Master data objects and business process objects that are specific to a deployment unit should be assigned to their respective deployment unit.

A process component of an external system is drawn as a dashed-line process component (drawn as icon 216). Such a process component may be referred to as an external process component, and it is used to represent the external system in describing interactions with the external system; however, this should be understood to require no more of the external system that it be able to produce and receive messages as required by the process component that interacts with the external system.

The connector icon 218 is used to simplify the drawing of interactions between process components.

Interactions between process component pairs involving their respective business objects, process agents, operations, interfaces, and messages are described as process component interactions, which determine the interactions of a pair of process components across a deployment unit boundary, i.e., from one deployment unit to another deployment unit. Interactions between process components are indicated in FIG. 1 by directed lines (arrows). Interactions between process components within a deployment unit need not be described except to note that they exist, as these interactions are not constrained by the architectural design and can be implemented in any convenient fashion. Interactions between process components that cross a deployment unit boundary will be illustrated by the figures of this patent application; these figures will show the relevant elements associated with potential interaction between two process components, but interfaces, process agents, and business objects that are not relevant to the potential interaction will not be shown.

The architectural design is a specification of a computer software application, and elements of the architectural design can be implemented to realize a software application that implements the end-to-end process mentioned earlier. The elements of the architecture are at times described in this specification as being contained or included in other elements; for example, a process component is described as being contained in a deployment unit. It should be understood, however, that such operational inclusion can be realized in a variety of ways and is not limited to a physical inclusion of the entirety of one element in another.

The architectural elements include the business object. A business object is a representation of a type of a uniquely identifiable business entity (an object instance) described by a structural model. Processes operate on business objects.

A business object represents a specific view on some well-defined business content. A business object represents content, which a typical business user would expect and understand with little explanation. Business objects are further categorized as business process objects and master data objects. A master data object is an object that encapsulates master data (i.e., data that is valid for a period of time). A business process object, which is the kind of business object generally found in a process component, is an object that encapsulates transactional data (i.e., data that is valid for a point in time). The term business object will be used generically to refer to a business process object and a master data object, unless the context requires otherwise. Properly implemented, business objects are implemented free of redundancies.

The architectural elements also include the process component. A process component is a software package that realizes a business process and generally exposes its functionality as services. The functionality contains business transactions. A process component contains one or more semantically related business objects. Any business object belongs to no more than one process component.

Process components are modular and context-independent. That they are context-independent means that a process component is not specific to any specific application and is reusable. The process component is the smallest (most granular) element of reuse in the architecture.

The architectural elements also include the operation. An operation belongs to exactly one process component. A process component generally has multiple operations. Operations can be synchronous or asynchronous, corresponding to synchronous or asynchronous process agents, which will be described below. An operation is the smallest, separately-callable function, described by a set of data types used as input, output, and fault parameters serving as a signature.

The architectural elements also include the service interface, referred to simply as the interface. An interface is a named group of operations. Each operation belongs to exactly one interface. An interface belongs to exactly one process component. A process component might contain multiple interfaces. In one implementation, an interface contains only inbound or outbound operations, but not a mixture of both. One interface can contain both synchronous and asynchronous operations. All operations of the same type (either inbound or outbound) which belong to the same message choreography will belong to the same interface. Thus, generally, all outbound operations to the same other process component are in one interface.

The architectural elements also include the message. Operations transmit and receive messages. Any convenient messaging infrastructure can be used. A message is information conveyed from one process component instance to another, with the expectation that activity will ensue. An operation can use multiple message types for inbound, outbound, or error messages. When two process components are in different deployment units, invocation of an operation of one process component by the other process component is accomplished by an operation on the other process component sending a message to the first process component.

The architectural elements also include the process agent. Process agents do business processing that involves the sending or receiving of messages. Each operation will generally have at least one associated process agent. A process agent can be associated with one or more operations. Process agents can be either inbound or outbound, and either synchronous or asynchronous.

Asynchronous outbound process agents are called after a business object changes, e.g., after a create, update, or delete of a business object instance.

Synchronous outbound process agents are generally triggered directly by a business object.

An output process agent will generally perform some processing of the data of the business object instance whose change triggered the event. An outbound agent triggers subsequent business process steps by sending messages using well-defined outbound services to another process component, which generally will be in another deployment unit, or to an external system. An outbound process agent is linked to the one business object that triggers the agent, but it is sent not to another business object but rather to another process component. Thus, the outbound process agent can be implemented without knowledge of the exact business object design of the recipient process component.

Inbound process agents are called after a message has been received. Inbound process agents are used for the inbound part of a message-based communication. An inbound process agent starts the execution of the business process step requested in a message by creating or updating one or multiple business object instances. An inbound process agent is not the agent of a business object but of its process component. An inbound process agent can act on multiple business objects in a process component.

Synchronous agents are used when a process component requires a more or less immediate response from another process component, and is waiting for that response to continue its work.

The architectural elements also include the deployment unit. A deployment unit one or more process components that are deployed together on a single computer system platform. Conversely, separate deployment units can be deployed on separate physical computing systems. The process components of one deployment unit interact with those of another deployment unit using messages passed through one or more data communication networks or other suitable communication channels. Thus, a deployment unit deployed on a platform belonging one business can interact with a deployment unit software entity deployed on a separate platform belonging to a different and unrelated business, allowing for business-to-business communication. More than one instance of a given deployment unit can execute at the same time, on the same computing system or on separate physical computing systems. This arrangement allows the functionality offered by a deployment unit to be scaled to meet demand by creating as many instances as needed.

Since interaction between deployment units is through service operations, a deployment unit can be replaced by other another deployment unit as long as the new deployment unit supports the operations depended upon by other deployment units. Thus, while deployment units can depend on the external interfaces of process components in other deployment units, deployment units are not dependent on process component interaction within other deployment units. Similarly, process components that interact with other process components or external systems only through messages, e.g., as sent and received by operations, can also be replaced as long as the replacement supports the operations of the original.

Interactions Between Process Components "Customer Invoice Processing at Supplier" and "Supplier Invoice Processing"

Figure 3:
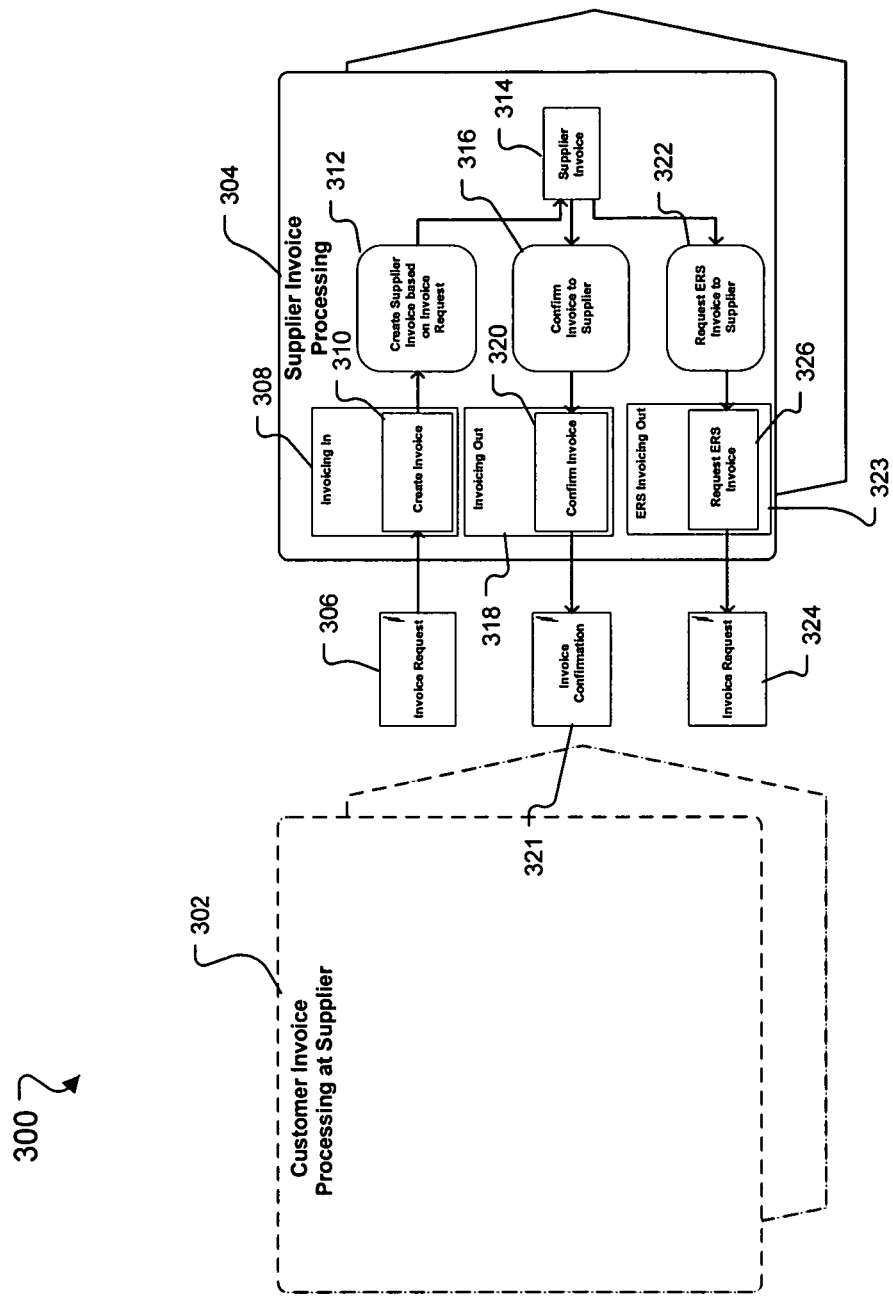
FIG. 3 is a block diagram showing interactions between a Customer Invoice Processing at Supplier process component and a Supplier Invoice Processing process component.

FIG. 3 is a block diagram showing interactions between a Customer Invoice Processing at Supplier process component 302 and a Supplier Invoice Processing process component 304 in the architectural design of FIG. 1.

The Supplier Invoice Processing process component 304 receives an Invoice Request message 306 into an Invoicing In interface 308. The Invoicing In interface 308 includes a Create Invoice operation 310 that creates a supplier invoice based on information received from the supplier or a different invoicing party. A Create Supplier Invoice based on Invoice Request inbound process agent 312 updates a Supplier Invoice business object 314. The Supplier Invoice business object 314 is a document that states a recipient's obligation to pay the supplier for goods received or services rendered.

After the update occurs, a Confirm Invoice to Supplier outbound process agent 316 sends an update to an Invoicing Out interface 318, which includes a Confirm Invoice operation 320. The Confirm Invoice operation 320 sends an Invoice Confirmation message 321 to notify the supplier whether the previously sent invoice is accepted or rejected, depending on the outcome of invoice verification. A Request ERS Invoice to Supplier outbound process agent 322 may also be triggered to send a message to the Customer Invoice Processing at Supplier process component 302 via an ERS I Invoicing Out interface 323. The ERS Invoicing Out interface 323 creates an Invoice Request message 324 by a Request ERS Invoice operation 326.

Interactions Between Process Components "Payment Processing" and "Accounting"

Figure 4:
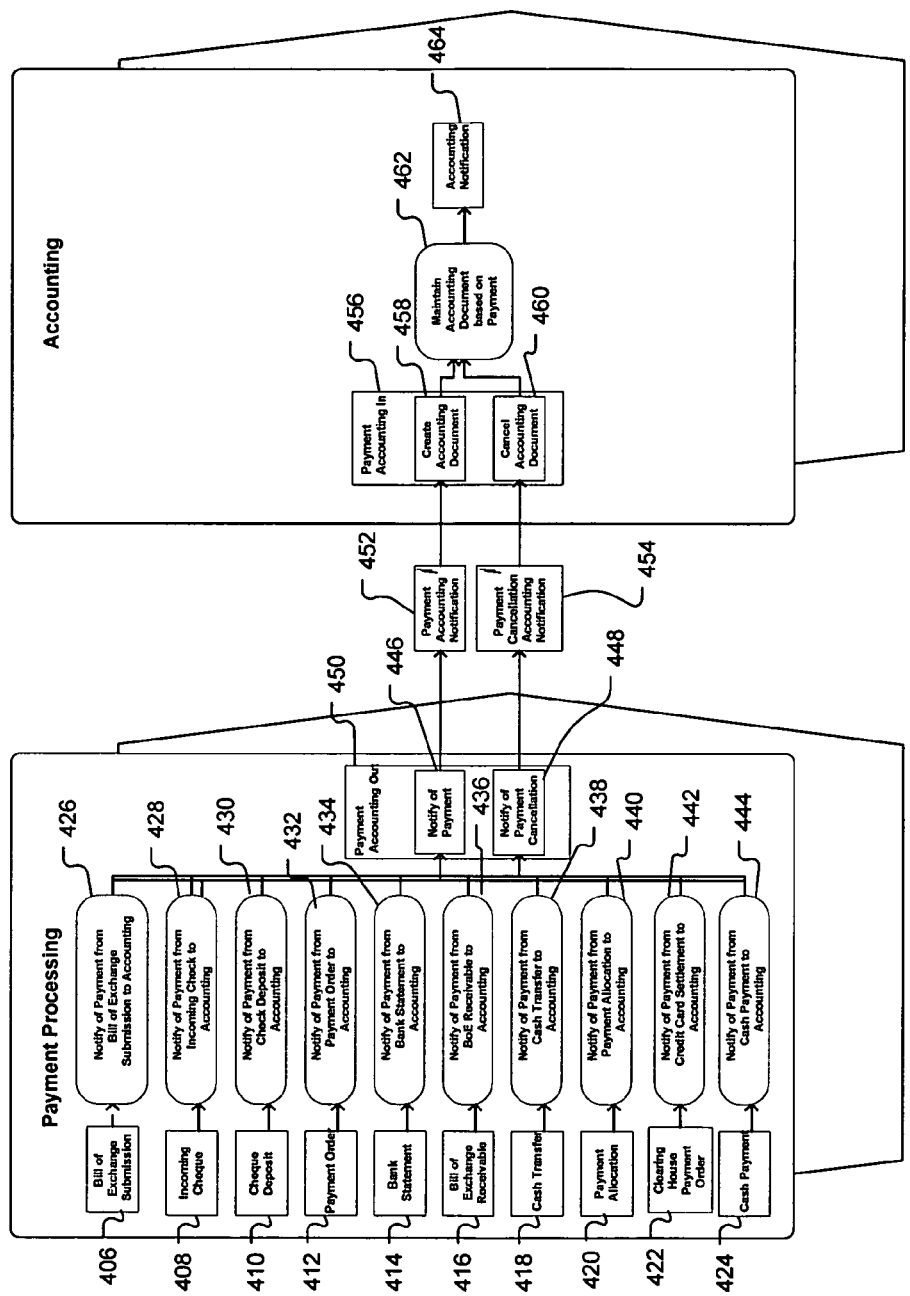
FIG. 4 is a block diagram showing interactions between a Payment Processing process component and an Accounting process component.

FIG. 4 is a block diagram showing interactions between a Payment Processing process component 402 and an Accounting process component 404 in the architectural design of FIG. 1. The Payment Processing process component 402 includes ten business objects: a Bill of Exchange Submission business object 406, an Incoming Check business object 408, a Check Deposit business object 410, a Payment Order business object 412, a Bank Statement business object 414, a Bill of Exchange Receivable business object 416, a Cash Transfer business object 418, a Payment Allocation business object 420, a Clearing House Payment Order business object 422, and a Cash Payment business object 424.

The Bill of Exchange Submission business object 406 sends incoming bill of exchange receivables to the house bank for cashing. The Incoming Check business object 408 represents a check sent by a business partner. The incoming check will be sent to the house bank by a check deposit. The Check Deposit business object 410 sends a collection of incoming checks to the house bank for cashing. The Payment Order business object 412 creates payment media for a bank, a credit card, a settlement institute, or a business partner on the base of payment requests. The Bank Statement business object 414 is a bank statement for a house bank account. The Bill of Exchange Receivable business object 416 represents a bill of exchange received from a business partner or a bill of exchange request sent to a business partner. The Cash Transfer business object 418 is a document that shows an internal money transfer between: a bank account and another bank account (bank transfer), a cash account and a bank account (cash deposit), a bank account and a cash account (cash withdrawal), or a cash account and another cash account (cash transfer). The Payment Allocation business object 420 documents a process step by which open payments of different types belonging to one another are indicated as confirmed or sent to other components for post processing. For example, an incoming check may confirm a payment advice or a bank statement item may confirm a check deposit. In another example, an incoming bank transfer from bank statement processing may be sent to Due Item Management for clearing. The Clearing House Payment Order business object 422 is an order document for clearing a collection of credit card payments to the clearing house. The Cash Payment business object 424 is a document showing an incoming or outgoing cash payment from or to a business partner.

The Payment Processing process component 402 also includes a number of outbound process agents, each tied to a particular business object. The Notify of Payment from Bill of Exchange Submission to Accounting outbound process agent 426 creates an accounting notification from the Bill of Exchange Submission business object 406. The Notify of Payment from Incoming Check to Accounting outbound process agent 428 may notify the Accounting process component 404 of a bounced or cancelled check. The Notify of Payment from Check Deposit to Accounting outbound process agent 430 may notify the Accounting process component 404 of a change in status of a check deposit. For example, a notification may be sent stating that a deposit is ready for transfer to another account. The Notify of Payment from Payment Order to Accounting outbound process agent 432 may notify the Accounting process component 404 of a payment by payment order or a cancellation of payment. The Notify of Payment from Bank Statement to Accounting outbound process agent 434 may notify the Accounting process component 404 of a payment by bank account or a cancellation of payment. The Notify of Payment from BoE Receivable to Accounting outbound process agent 436 may notify the Accounting process component 404 of a payment made by a bill of exchange or a cancellation of payment. The Notify of Payment from Cash Transfer to Accounting outbound process component 438 may notify the Accounting process component 404 about a transfer of money between house bank accounts and/or cash accounts or a cancellation of payment. The Notify of Payment from Payment Allocation to Accounting outbound process agent 440 may notify the Accounting process component 404 of a payment made by a payment allocation or a cancellation of payment. The Notify of Payment from Credit Card Settlement to Accounting outbound process agent 442 may notify the Accounting process component 404 of a payment made by credit card or a cancellation of payment. The Notify of Payment from Cash Payment to Accounting outbound process agent 444 may notify the Accounting process component 404 of a payment made by cash or a cancellation of payment.

The outbound process agents above may cause invocation of a Notify of Payment operation 446 or a Notify of Payment Cancellation operation 448 to update accounting. The operations may be included in a Payment Accounting Out interface 450. An operation in the Payment Accounting Out interface 450 may send a Payment Accounting Notification message 452 or a Payment Accounting Cancellation Notification message 454 to a Payment Accounting In interface 456 in the Accounting process component 404. The Payment Accounting In interface 456 includes a Create Accounting Document operation 458 or a Cancel Accounting Document operation 460 depending on the received message. A Maintain Accounting Document based on Payment inbound processing component 462 updates the Accounting Notification business object 464. The Accounting Notification business object 464 is a common input channel for all kinds of operational business transactions into Financial Accounting. The Accounting Notification business object 464 may also be called by operational components in order to record the business transactions in financial accounting.

Interactions Between Process Components "Internal Request Processing" and "Supplier Invoice Processing"

Figure 5:
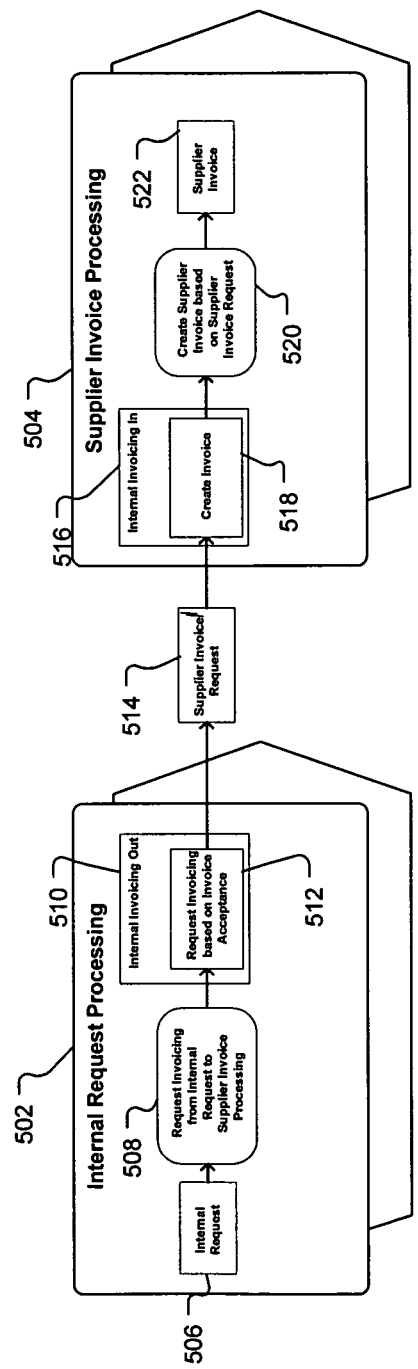
FIG. 5 is a block diagram showing interactions between an Internal Request component and a Supplier Invoice component.

FIG. 5 is a block diagram showing interactions between an Internal Request process component 502 and a Supplier Invoice process component 504 in the architectural design in FIG. 1. The Internal Request process component 502 includes an Internal Request business object 506. The Internal Request business object 506 is a request for the procurement of goods and services. The Internal Request business object 506 can be fulfilled by a purchase request object or by an in-house requirement object. The Internal Request business object 506 sends updates using a Request Supplier Invoice from Internal Request to Supplier Invoice Processing process agent 508, to an Internal Invoicing Out interface 510. The Internal Invoicing Out interface 510 includes a Request Invoicing based on Invoice Acceptance operation 512. The Request Invoicing based on Invoice Acceptance operation 512 creates a Supplier Invoice message 514, which is sent to the Supplier Invoice process component 504, to handle the creation of a supplier invoice out of delivered goods and rendered services.

The Supplier Invoice component 504 may receive the Supplier Invoice message 514 and use the message 514 to automatically create an invoice for the completed open amount of requested goods or services. The Supplier Invoice process component 504 includes an Internal Invoicing In interface 516 and a Supplier Invoice business object 522. The Internal Invoicing In interface 516 includes a Create Invoice operation 518. The received Supplier Invoice message 514 may invoke the Create Invoice operation 518 to create a supplier invoice based on an internal request included in the Supplier Invoice message 514. The Supplier Invoice business object 522 is a document that states the recipient's, such as the purchaser's, obligation to pay the supplier for goods received or services rendered. The Create Invoice operation 518 then updates the Supplier Invoice 522 using a Create Supplier Invoice based on Supplier Invoice Request process agent 520.

Interactions Between Process Components "Payment Processing" and "Payment Order Processing at House Bank"

Figure 6:
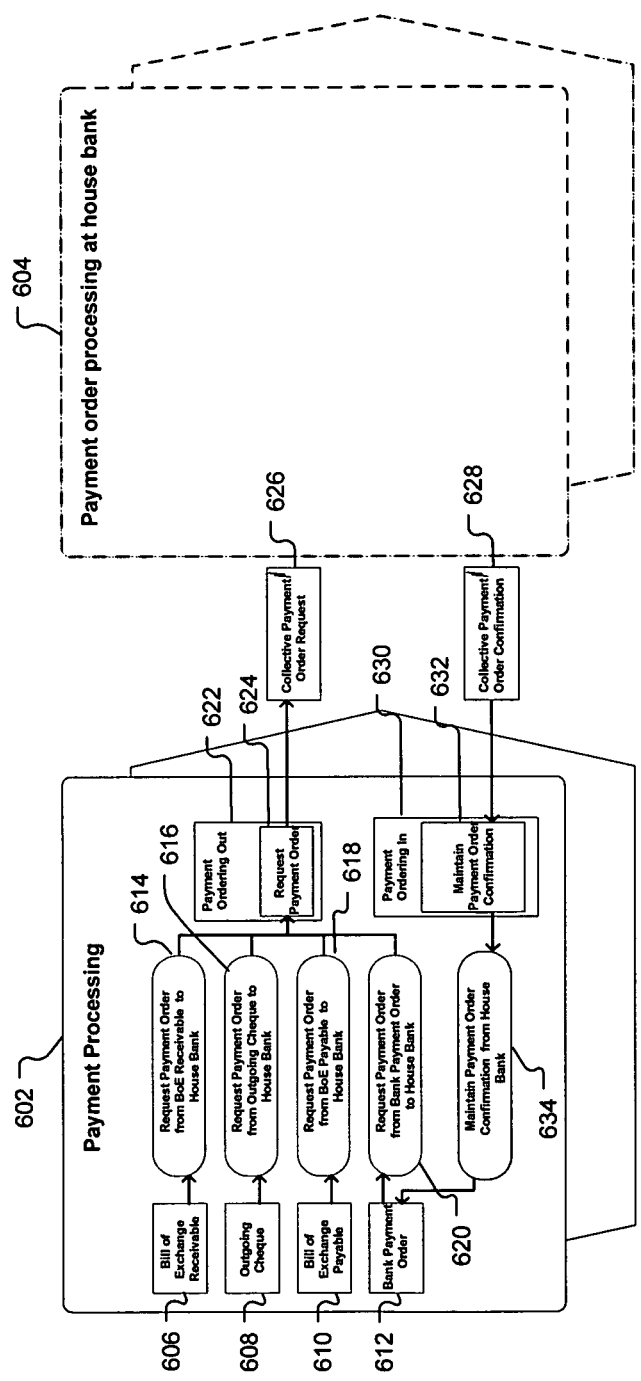
FIG. 6 is a block diagram showing interactions between a Payment Processing process component and a Payment Order processing at house bank process component.

FIG. 6 is a block diagram showing interactions between a Payment Processing process component 602 and a Payment Order processing at house bank process component 604 in the architectural design of FIG. 1. The Payment Processing process component 602 includes four business objects: a Bill of Exchange Receivable business object 606 that represents a Bill of Exchange received from or a Bill of Exchange Request sent to a business partner, an Outgoing Check business object 608 that represents a check sent to a business partner that is created via payment order, a Bill of Exchange Payable business object 610 that represents a Bill of Exchange sent to a business partner that is created only via payment order, and a Bank Payment Order business object 612, which is a Payment Order that will be sent to a house bank and may contain bank transfers as well direct debits.

Various process agents are used to send updates for each of these business objects 606, 608, 610, and 612. The Request Payment Order from BoE Receivable to House Bank outbound process agent 614 creates an electronic Bill of Exchange Receivable (Request). The Request Payment Order from Outgoing Check to House Bank outbound process agent 616 creates an outgoing check to be printed externally. The Request Payment Order from BoE Payable to House Bank outbound process agent 618 creates an electronic Bill of Exchange Payable. The Request Payment Order from Bank Payment Order to House Bank outbound process agent 620 creates a Payment order to House Bank.

The Payment Ordering out interface 622 receives the updates from the outbound process agents 614, 616, 618, and 620. A Request Payment Order operation 624 collects Bank Transfers or Direct Debits for payment submission to the business partner. A Collective Payment Order Request message 626 is generated and processed by the Payment order processing at house bank process component 604. Upon completion of processing, a Collective Payment Order Confirmation message 628 is sent to the Payment Ordering In interface 630 that includes a Maintain Payment Order Confirmation operation 632 to confirm the status updates from processing a payment order. After completing the operation 632, an update is sent to the Bank Payment Order business object 612 using a Maintain Payment Order Confirmation from House Bank inbound process agent 634.

Interactions Between Process Components "Purchase Order Processing" and "Sales Order Processing at Supplier"

Figure 7:
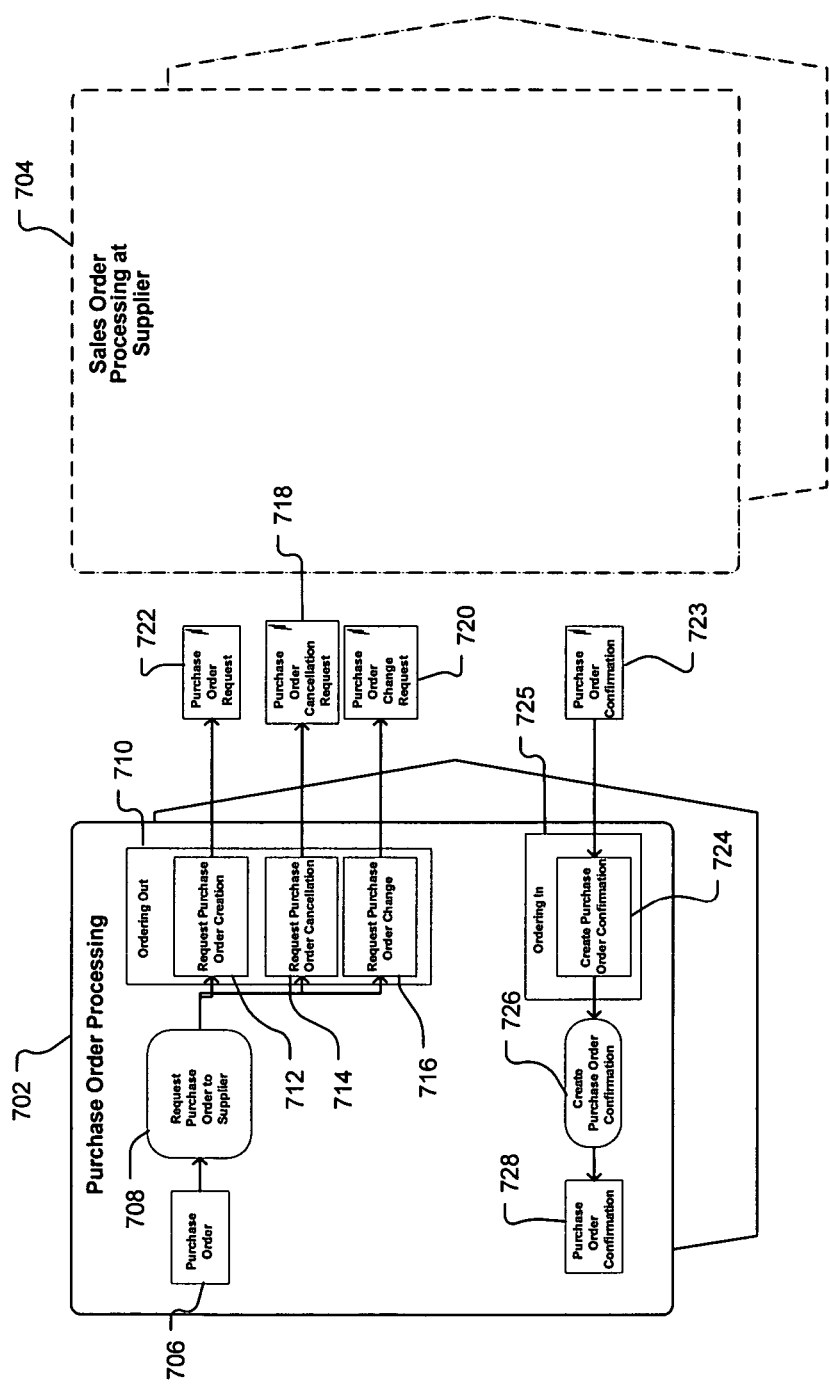
FIG. 7 is a block diagram showing interactions between a Purchase Order Processing process component and a Sales Order Processing at Supplier process component.

FIG. 7 is a block diagram showing interactions between a Purchase Order Processing process component 702 and a Sales Order Processing at Supplier process component 704 in the architectural design of FIG. 1. The Purchase Order Processing process component 702 includes a Purchase Order business object 706, which is a request from a purchaser to an external supplier to deliver a specified quantity of goods, or perform a specified service, within a specified time. The Request Purchase Order to Supplier outbound process agent 708 can request invocation of a Request Purchase Order Creation operation 712, a Request Purchase Order Cancellation operation 714, or a Request Purchase Order Change operation 716 in an Ordering Out interface 710.

The Request Purchase Order Cancellation operation 714 requests a Cancellation of a Purchase Order that was formerly ordered at a supplier, which creates a Purchase Order Cancellation Request message 718. The Request Purchase Order Change operation 716 requests a change of a purchase order that was formerly ordered at the supplier which creates a Purchase Order Change Request message 720. The Request Purchase Order Creation operation 712 requests a Purchase Order from a Supplier that creates a Purchase Order Change Request 722.

Upon receiving a create, a change, or a cancellation message, the Sales Order Processing process component 704 may create a Purchase Order Confirmation message 723 to update the Purchase Order Processing component 702. To complete the update, a Create Purchase Order Confirmation operation 724, included in an Order In interface 725, may transfer the update to the Purchase Order Confirmation business object 728 by using a Create Purchase Order inbound process agent 726. The Purchase Order Confirmation business object 728 is a confirmation from an external supplier to the request of a purchaser to deliver a specified quantity of material, or perform a specified service, at a specified price within a specified time.

Interactions Between Process Components "Supplier Invoice Processing" and "Due Item Processing"

Figure 8:
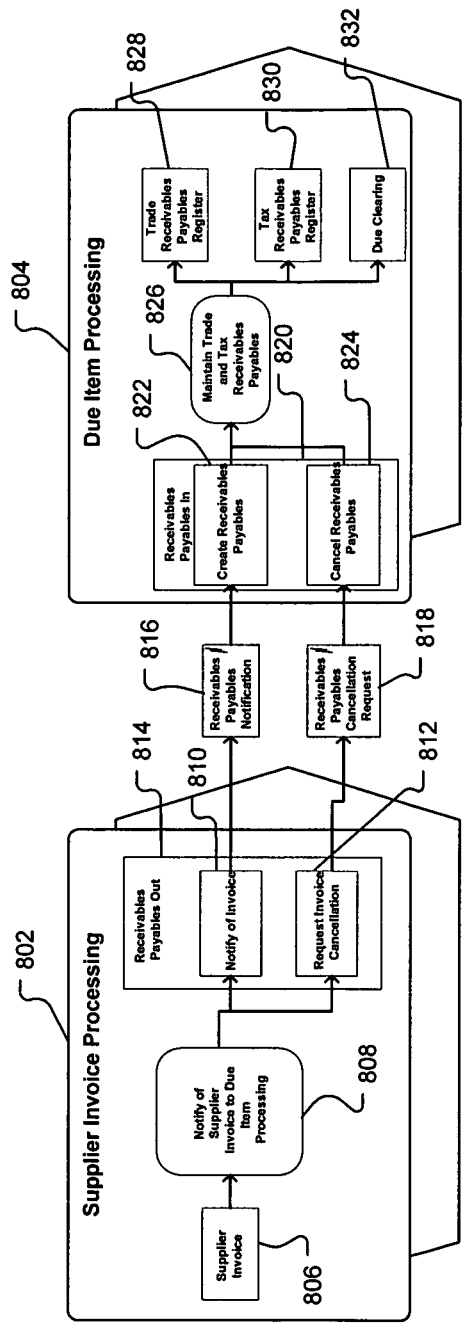
FIG. 8 is a block diagram showing interactions between a Supplier Invoice Processing process component and Due Item Processing process component.

FIG. 8 is a block diagram showing interactions between a Supplier Invoice Processing process component 802 and Due Item Processing process component 804 in the architectural design of FIG. 1.

A Supplier Invoice Processing process component 802 includes a Supplier Invoice business object 806, which is a document that states the recipient's (usually the purchaser's) obligation to pay the supplier for goods received or services rendered. The invoice is normally created after the goods and service acknowledgment has been confirmed. The Notify Supplier of Invoice to a Due Item Processing outbound process agent 808 invokes a Notify of Invoice operation 810 to notify the Due Item processing component 804 about the receivables/payables due for the invoice that has been paid. Alternatively, a Request Invoice Cancellation operation 812 may be invoked to cancel the previously sent notification for receivables/payables due. Both operations may be included in a Receivables Payables Out interface 814. If the Notify of Invoice operation 810 is invoked, then a Receivables Payables Notification message 816 is sent to the Due Item Processing process component 804. If the Request Invoice Cancellation operation 812 is invoked, the Receivables/Payables Cancellation Request message 818 is sent to the Due Item Processing process component 804.

The Receivables/Payables Messages 816 and 818 are received by a Receivables/Payables In interface 820 where operations may be performed. If the notification message 816 is received, then a Create Receivables/Payables operation 822 is performed to create a trade and/or tax receivable or payable. If the cancellation message 818 is received, then a Cancel Receivables/Payables operation 824 is performed to cancel a trade and/or tax receivable or payable. Cancellations and updates may be sent by a Maintain Trade and Tax Receivables Payables inbound process agent 826 to one or more of three business objects: a Trade Receivables Payables business object 828, A Tax Receivables Payables business object 830, and a Due Clearing business object 832. The Trade Receivables Payables business object 828 may register for all trade receivables and payables from goods and services of a company from/to its business partners. The Tax Receivables Payables business object 830 may register for all tax receivables and payables of a company that are due for delivered goods and rendered services between buyers and sellers, the consumption of goods, and the transfer of goods that are withheld from payments to vendors. The Due Clearing business object 832 is group of receivables and payables for clearing.

Interactions Between Process Components "Purchase Order Processing" and "Accounting"

Figure 9:
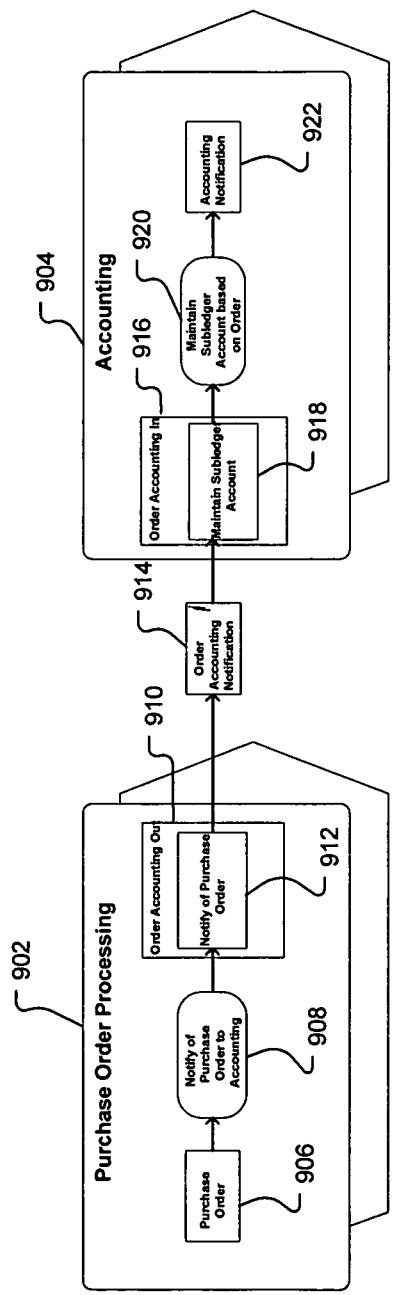
FIG. 9 is a block diagram showing interactions between a Purchase Order Processing process component and an Accounting process component.

FIG. 9 is a block diagram showing interactions between a Purchase Order Processing process component 902 and an Accounting process component 904 in the architectural design of FIG. 1. The Purchase Order Process component 902 includes the Purchase Order business object 906, which passes information into a Notify of Purchase Order to Accounting outbound process agent 908. The information may contain notifications about created, changed or cancelled purchase orders.

The outbound process agent 908 sends notification into an Order Accounting Out interface 910 which includes a Notify of Purchase Order operation 912. The Notify of Purchase Order operation 912 may occur when a purchase order has been created, changed or cancelled. An Order Accounting Notification message 914 may then be sent to the Accounting process component 904.

The Accounting process component 904 receives the Order Accounting Notification message 914 in an Order Accounting In interface 916 which includes a Maintain Subledger Account operation 918 that receives order accounting notifications from the Purchase Order Processing process component 902. The notification is to inform Accounting Processing process component 904 about the creation, the change or the deletion of any kind of order business objects. The notification may then be sent to the Accounting Notification business object 922 using a Maintain Subledger Account based on Order inbound process agent 920. The Accounting Notification business object 922 is a common input channel for all kinds of operational business transactions into financial accounting that is called by operational components in order to record the business transactions in financial accounting.

Interactions Between Process Components "RFQ Processing" and "Opportunity/Customer Quote Processing at Supplier"

Figure 10:
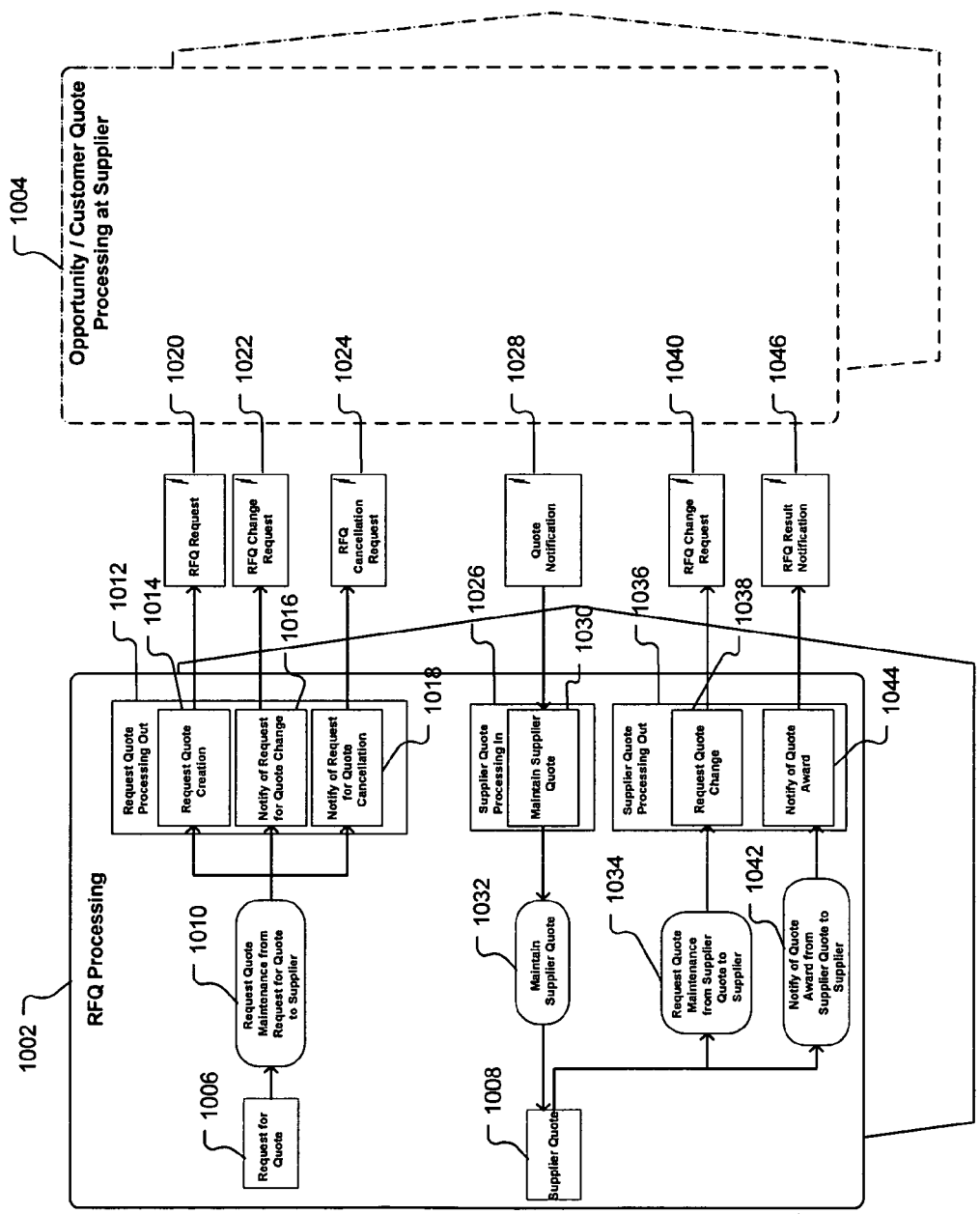
FIG. 10 is a block diagram showing interactions between an RFQ Processing process component and an Opportunity/Customer Quote Processing at Supplier process component.

FIG. 10 is a block diagram showing interactions between an RFQ Processing process component 1002 and an Opportunity/Customer Quote Processing at Supplier process component 1004 in the architectural design of FIG. 1.

The Request for Quote Process component 1002 includes two business objects: a Request for Quote business object 1006 and a Supplier Quote business object 1008. The Request for Quote business object 1006 is a request from a buyer to a bidder to submit a quote for a material or a service according to specified criteria. The Supplier Quote business object 1008 is a response to a Request for Quote, in which a supplier offers to sell materials and services according to the requested criteria.

An update of the Request for Quote business object 1006 may trigger a Request Quote Maintenance from Request for Quote to Supplier outbound process agent 1010 to call an operation included in a Request Quote Processing Out interface 1012. The Request Quote Processing Out interface 1012 includes a Request Quote Creation operation 1014, a Notify of Request for Quote Change operation 1016, and a Notify of Response for Quote Cancellation operation 1018. The Request Quote Creation operation 1014 sends an RFQ message 1020 to a supplier to participate in an RFQ process. The Notify of Request for Quote Change operation 1016 notifies the changes of a published Request for Quote to a supplier to participate in the further RFQ process and sends a RFQ Change Request message 1022 to the Opportunity/Customer Quote Processing at Supplier process component 1004. The Notify of Response for Quote Cancellation operation 1018 notifies the Opportunity/Customer Quote Processing at Supplier process component 1004 about a cancellation of the Request for Quote to the Supplier by sending an RFQ Cancellation Request message 1024.

Additionally, the RFQ Processing process component includes a Supplier Quote Processing In interface 1026. A Quote Notification message 1028 may be received in the Supplier Quote Processing In interface 1026, and a Maintain Supplier Quote operation 1030, included in the Supplier Quote Processing In interface 1026, may update the Supplier quote business object 1008 using a Maintain Supplier Quote inbound process agent 1032.

When the status of the Request for Quote business object 1006 is "Published" or "Closed" and the status of Supplier Quote is "Returned", a Request Quote Maintenance from Supplier Quote to Supplier outbound process agent 1034 may be triggered to send an update to a supplier using a Supplier Quote Processing Out interface 1036. The Supplier Quote Processing Out interface 1036 includes a Request Quote Change operation 1038 that, when called, may send an RFQ Change Request message 1040 to send back the supplier quote.

When the status of the Supplier Quote business object 1008 is set to "Accepted" or "Rejected", a Notify of Quote Award from Supplier Quote to Supplier outbound process agent 1042 may be triggered to send, via the Supplier Quote Processing Out interface 1036, an update to supplier. The Supplier Quote Processing Out interface 1036 includes a Notify of Quote Award operation 1044 that when called, may send an RFQ Result Notification message 1046, which may include an acceptance or final rejection information of the quote, to the supplier.

Interactions Between Process Components "Purchase Order Processing" and "Supplier Invoice Processing"

Figure 11:
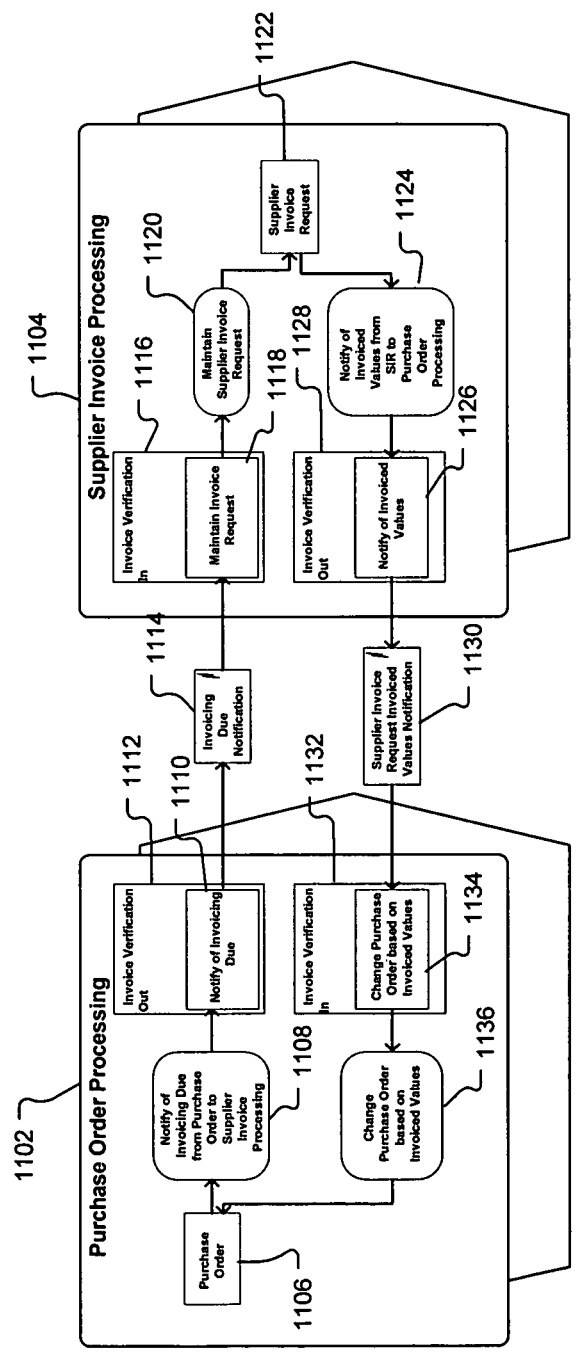
FIG. 11 is a block diagram showing interactions between a Purchase Order Processing process component and a Supplier Invoice Processing process component.

FIG. 11 is a block diagram showing interactions between a Purchase Order Processing process component 1102 and a Supplier Invoice Processing process component 1104 in the architectural design of FIG. 1. The Purchase Order Processing process component 1102 includes a Purchase Order business object 1106, which includes a request from a purchaser. An update in the Purchase Order Processing process component 1102 may trigger a Notify of Invoicing Due from Purchase Order to Supplier Invoice Processing outbound process agent 1108 to invoke a Notify of Invoicing Due operation 1110. The Notify of Invoicing Due operation 1110, which is included in an Invoice Verification Out interface 1112, may send an Invoicing Due Notification message 1114 that will be received by elements in the Supplier Invoice Processing process component 1104. The message 1114 is routed to an Invoice Verification In interface 1116, where a Maintain Invoice Request operation 1118 is invoked to create or update a reference object in the Supplier Invoice Processing deployment unit in order to perform invoice verification with reference to a purchase order without having to access other deployment units. The Maintain Supplier Invoice Request outbound process agent 1120 sends updates or changes to the invoice data into the Supplier Invoice Request business object 1122. The system uses the Supplier Invoice Request business object 1122 as a basis for invoice verification, as well as for the automatic creation of the invoice.

In this illustration, the Notify of Invoiced Values from SIR to Purchase Order Processing outbound process agent 1124 includes a Notify of Invoiced Values operation 1126 of an Invoice Verification Out interface 1128 to send a Supplier Invoice Request Invoiced Values Notification message 1130 that will be received by components in the Purchase Order Processing process component 1102. The notification message is sent to make certain that if parts of a purchase order have been previously posted, the corresponding purchase order is not changed to an amount lower than the one that has already been delivered. Upon receipt of the message, the Invoice Verification In interface 1132 includes a Change Purchase Order based on Invoiced Values operation 1134 to change appropriate invoiced quantities in the purchase order. The updated change information is sent to the Purchase Order business object 1106 using the Change Purchase Order based on Invoiced Values inbound process agent 1136. This message is sent in order to be able to change the invoiced quantity.

Interactions Between Process Components "Goods and Service Acknowledgement" and "Accounting"

Figure 12:
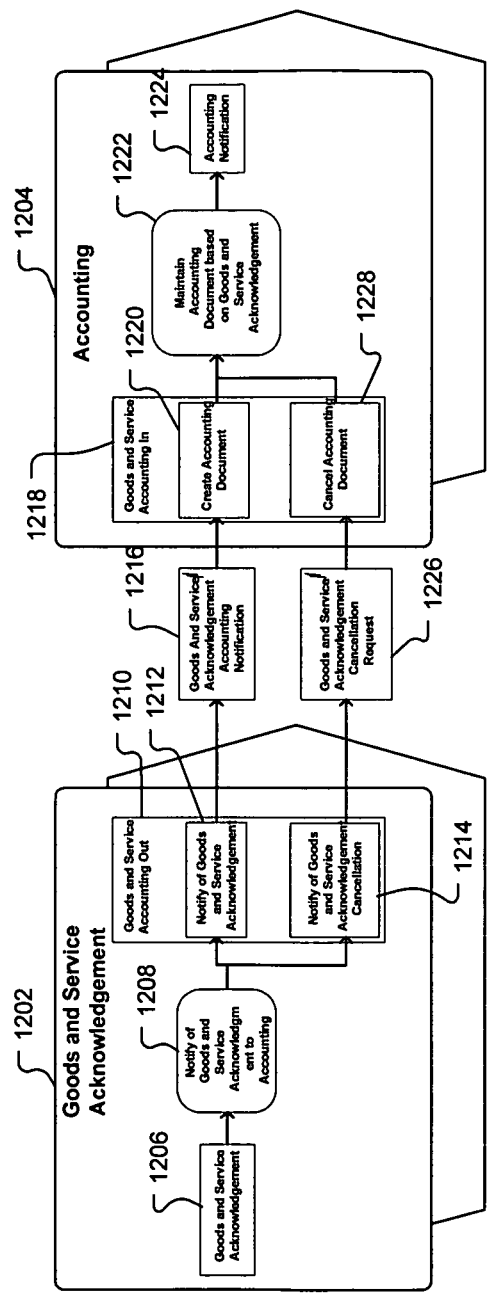
FIG. 12 is a block diagram showing interactions between a Goods and Service Acknowledgement process component and an Accounting process component.

FIG. 12 is a block diagram showing interactions between a Goods and Service Acknowledgement process component 1202 and an Accounting process component 1204 in the architectural design of FIG. 1. The Goods and Service Acknowledgement process component 1202 includes a Good and Service Acknowledgement business object 1206, a document reporting the receipt of goods and services. When the Goods and Service Acknowledgement business object 1206 has been confirmed, a Notify of Goods and Service Acknowledgement to Accounting outbound process agent 1208 is triggered to notify to accounting if a valuation is required when a goods and service acknowledgement is confirmed. The Notify of Goods and Service Acknowledgement to Accounting outbound process agent 1208 may invoke either a Notify of Goods and Service Acknowledgement operation 1212 or a Notify of Goods and Service Acknowledge Cancellation operation 1214. Both operations may are part of a Goods and Service Accounting Out interface 1210. If the Notify of Goods and Service Acknowledgement operation 1212 is called, it may send accounting information about rendered goods or services performed to the Accounting process component 1204 by transmitting a Goods and Service Acknowledgement Accounting Notification message 1216. The Accounting process component 1204 may receive the message 1216 through a Goods and Service Accounting In interface 1218, which include a Create Accounting Document operation 1220. The Create Accounting Document operation 1220 receives Goods Movement Resource Consumption Notification from the Goods and Service Acknowledgement process component 1202. The operation 1220 may trigger a Maintain Accounting Document based on a Goods and Service Acknowledgement Description inbound process agent 1222 to update or create an Accounting Notification business object 1224.

If the Notify of Goods and Service Acknowledgement to Accounting outbound process agent 1208 calls the Notify of Goods and Service Acknowledgement Cancellation operation 1214, the operation 1214 may send accounting information about cancellation of rendered goods or services to the Accounting process component 1204 by transmitting a Goods and Service Acknowledgement Cancellation Request message 1226. The Accounting process component 1204 may receive the message 1226 through the Goods and Service Accounting In interface 1218. The Cancel Accounting Document operation 1228 receives the Goods and Service Acknowledgement Cancellation Request message 1226 from the Goods and Service Acknowledgement process component 1202. The operation 1228 may also trigger the Maintain Accounting Document based on a Goods and Service Acknowledgement Description inbound process agent 1222 to cancel the Accounting Notification business object 1224.

Interactions Between Process Components "Goods and Service Confirmation at Supplier" and "Goods and Service Acknowledgement"

Figure 13:
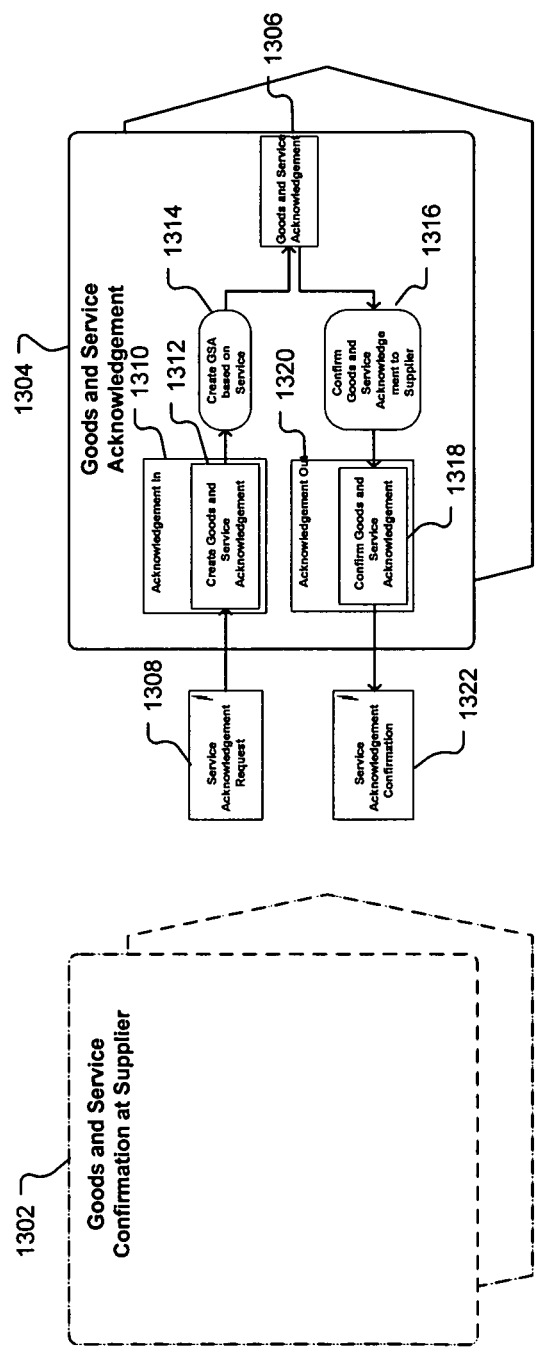
FIG. 13 is a block diagram showing interactions between a Goods and Service Confirmation at Supplier process component and a Goods and Service Acknowledgement process component.

FIG. 13 is a block diagram showing interactions between a Goods and Service Confirmation at Supplier process component 1302 and a Goods and Service Acknowledgement process component 1304 in the architectural design of FIG. 1.

The Goods and Service Acknowledgement process component 1304 includes a Goods and Service Acknowledgement business object 1306. The Goods and Service Acknowledgement business object 1306 is a document that reports the receipt of goods and services. For example, employees of a company can confirm that they have received the goods and services they ordered through internal requests using the Goods and Service Acknowledgement business object 1306. The Goods and Service Acknowledgement business object 1306 may receive updates when the Goods and Service Acknowledgement component 1304 receives a Service Acknowledgement Request message 1308. Through an Acknowledgement In interface 1310, which includes a Create Goods and Service Acknowledgement operation 1312, the Service Acknowledgement Request message 1308 may be received. Next, the Create Goods and Service Acknowledgement operation 1312 creates a goods and service acknowledgement based on information received from the received Service Acknowledgement Request message 1308. In some embodiments, a supplier may also create a Goods and Service Acknowledgment by Extensible Markup Language (XML). The Create Goods and Service Acknowledgement operation 1312 updates, using a Create Goods and Service Acknowledgment based on Service Acknowledgement Request inbound process agent 1314, the Goods and Service Acknowledgement business object 1306.

After the update occurs, a Confirm Goods and Service Acknowledgement to Supplier outbound process agent 1316 invokes a Confirm Goods and Service Acknowledgement operation 1318, included in a Acknowledgement Out interface 1320, to send a Service Acknowledgement Confirmation message 1322 to notify the supplier whether the previously sent service Acknowledgement Request message 1308 is accepted or rejected.

Interactions Between Process Components "Due Item Processing" and "Payment Processing"

Figure 14:
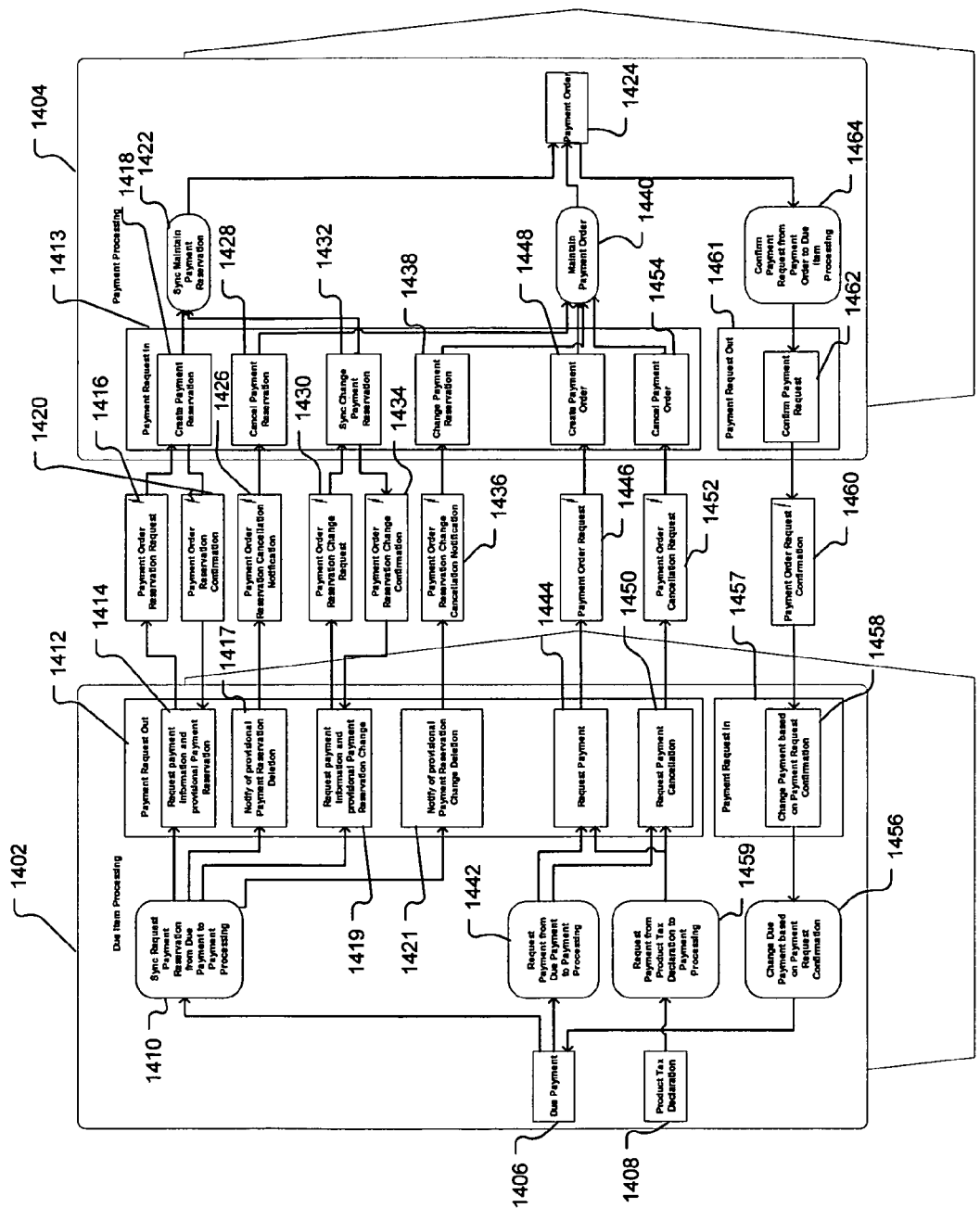
FIG. 14 is a block diagram showing interactions between a Due Item Processing process component and a Payment Processing process component.

FIG. 14 is a block diagram showing interactions between a Due Item Processing process component 1402 and a Payment Processing process component 1404 in the architectural design of FIG. 1. The Due Item Processing process component 1402 may be used to manage all payables and receivables from service and supply and corresponding sales including a withholding tax. The Payment Processing process component 1404 is used to handle all incoming and outgoing payments and represent the main database for a liquidity status.

The process components include business objects to create and update data by passing messages between a Payment Processing process component 1404 and a Due Item Processing process component 1402. Multiple operations can be carried out within the interfaces. Both inbound and outbound process agents carry the business object data to and from the interfaces.

A Due Payment business object 1406 and a Product Tax Declaration business object 1408 are shown in FIG. 14. The due payment business object 1406 may create payment requests manually or automatically for payment processing. The Product Tax Declaration business object 1408 is a declaration of the product tax liabilities/receivables of a company to the responsible tax authority according to the tax declaration arrangement and country specific legal requirements that triggers the payment to the tax authority.

A Sync Request Payment Reservation interface from Due Payment to Payment Processing outbound process component 1410 may create a payment reservation request from Due Payment. A Payment Request Out interface 1412 includes several operations which go on to create messages and updates to business objects in the Payment Processing process component 1404. The operations, messaging and business objects are discussed in the following paragraphs.

A Sync Request Payment Reservation interface from Due Payment to Payment Processing outbound process component 1410 may also send a message initiating a payment from Product Tax Declaration, by invoking a synchronous Request payment information and provisional Payment Reservation operation 1414 to generate a Payment Order Reservation Request message 1416. The message is received in a Payment Request In interface 1413 having a synchronous Create Payment Reservation operation 1418 that checks and determines payment data and creates a reservation of payment. A Payment Order Reservation Confirmation message 1420 may be sent back to the Due Item Processing process component 1402. Next, a Synchronous Maintain Payment Reservation outbound process component 1422 may update the Payment Order business object 1424.

The Payment Request Out interface 1412 may also include a Notify of provisional Payment Reservation Deletion operation 1417 that registers the change of a provisional payment to the last transactional or saved state. A Payment Order Reservation Cancellation Notification message 1426 may be generated and a Cancel Payment Reservation operation 1428 may be invoked that cancels a previously sent payment reservation by reference.

The Payment Request Out interface 1412 may also include a synchronous Request Payment Information and Provisional Payment Reservation Change operation 1419 that requests payment information with a provisional reservation of money in payment processing. A Payment Order Reservation Change Request message 1430 is generated, and a synchronous Sync Change Payment Reservation operation 1432 is invoked that changes a reservation of payment and confirm the change to the caller. Next, a Payment Order Reservation Change Confirmation message 1434 may be generated and sent back to the Due Item Processing process component 1402.

The Payment Request Out interface 1412 may also include a Notify of Provisional Payment Reservation Change Deletion operation 1421 that registers the change of a provisional payment to the last transactional/saved state. A Payment Order Reservation Change Cancellation Notification message 1436 may be generated, and a Change Payment Reservation operation 1438 may be invoked that changes a previously sent payment reservation by reference.

A Request Payment from Due Payment to Payment Processing outbound process agent 1442 may send a payment update from a Due Payment business object 1406. A Request Payment operation 1444 is then invoked that sends a request for payment to Payment Processing. This operation may confirm a provisional payment made before. Upon completion of the operation, a Payment Order Request message 1446 is sent to the Payment Processing process component 1404, where a Create Payment Order operation 1448 begins. Then, a Maintain Payment Order inbound process agent 1440 may update the Payment Order business object 1424 to create or cancel a payment order.

The Payment Order business object 1424 may use a Confirm Payment Request from Payment Order to Due Item Processing outbound process agent 1464 to confirm the processing status of a payment to the sender of a payment request. A Confirm Payment operation 1462, contained in a Payment Request Out interface 1461, may then be invoked, thereby generating a Payment Order Request Confirmation message 1460 to send to the Due Item Processing process component 1402, where it is received by a Change Payment based on Payment Request Confirmation operation 1458 provided by a Payment Request In interface 1457. A Change Due Payment based on Payment Request Confirmation interface may update the processing status of Due Payment based on the confirmation of a payment request. A Request Payment from Product Tax Declaration to Payment Processing outbound process agent 1459 may send an update from a Product Tax Declaration business object 1408. The update is sent into the Payment Request Out interface 1412, and a Request Payment Cancellation operation 1450 is invoked to cancel a provisional, requested or ordered payment. A Payment Order Cancellation Request message 1452 is then generated and sent to the Payment Processing process component 1404 where a Cancel Payment Order operation 1454 is invoked.

Interactions Between Process Components "RFQ Processing" and "Purchase Order Processing"

Figure 15:
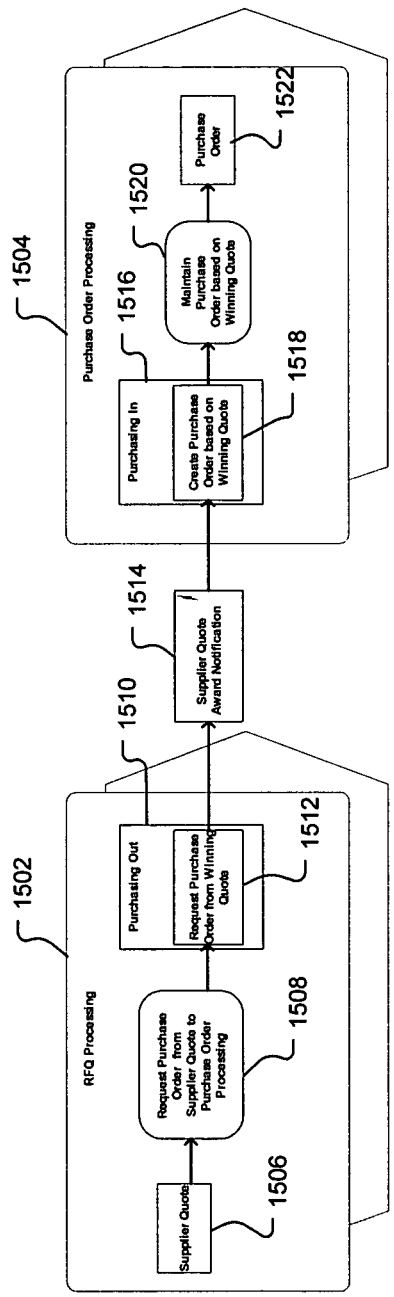
FIG. 15 is a block diagram showing interactions between an RFQ Processing process component and a Purchase Order Processing process component.

FIG. 15 is a block diagram showing interactions between an RFQ Processing process component 1502 and a Purchase Order Processing process component 1504 in the architectural design of FIG. 1. The process component interaction model begins the Request for Quote Processing process component 1502 with a Supplier Quote business object 1506 having an update. The Supplier Quote business object 1506 is a response to a Request for Quote, in which a supplier offers to sell materials and services according to the requested criteria. A request may be sent using a Request Purchase Order form supplier Quote to Purchase Order Processing outbound process agent 1508. The Purchasing Out interface 1510 includes a Request Purchase Order from Winning Quote operation 1512 that creates or updates a Purchase Request (Purchase Order) based on accepted Supplier Quote. A Supplier quote Award Notification message 1514 is sent to a Purchasing In interface 1516 in the Purchase Order Processing process component 1504. A Create Purchase Order based on Winning Quote operation 1518 may be invoked to create a Purchase Order from an accepted Supplier Quote. An update to a Purchase Order business object 1522 will be sent using a Maintain Purchase Order based on Winning Quote inbound process agent 1520.

Interactions Between Process Components "Bank Statement Creation at Bank" and "Payment Processing"

Figure 16:
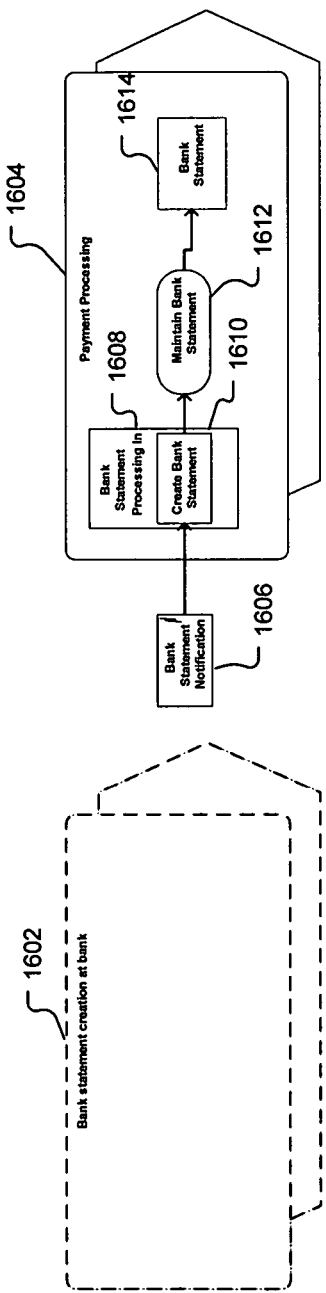
FIG. 16 is a block diagram showing interactions between a Bank statement creation at bank process component and a Payment Processing process component.

FIG. 16 is a block diagram showing interactions between a Bank statement creation at bank process component 1602 and a Payment Processing process component 1604 in the architectural design of FIG. 1.

As shown in FIG. 16, a bank statement is created at a bank and a Bank Statement Notification message 1606 is created. The Payment Processing process component 1604 receives the Bank Statement Notification message 1606 into the Bank Statement Processing In interface 1608 where a Create Bank Statement operation 1610 is invoked to create a bank statement in the Payment Processing process component 1604. A Maintain Bank Statement inbound process agent 1612 updates the Bank Statement business object 1614 by creating a new bank statement or modifying an existing bank statement. For example, the bank statement may be a statement for a house bank account where modifications are made when bills are paid.

Interactions Between Process Components "Purchase Request Processing" and "RFQ Processing"

Figure 17:
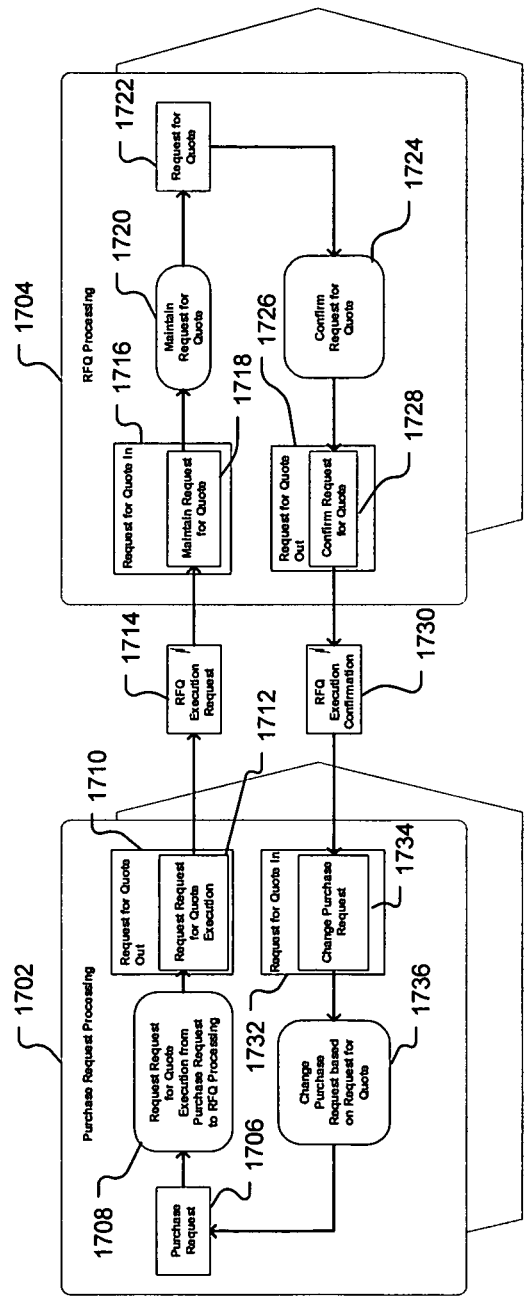
FIG. 17 is a block diagram showing interactions between a Purchase Request Processing process component and an RFQ Processing process component.

FIG. 17 is a block diagram showing interactions between a Purchase Request Processing process component 1702 and an RFQ Processing process component 404 in the architectural design of FIG. 1. The Purchase Request Processing process component 1702 includes a Purchase Request business object 1706. The Purchase Request business object 1706 contains a request or instruction to the purchasing department to purchase goods or services in specified quantities within a particular period.

In the Purchase Request Processing process component 1702, a Request Request for Quote Execution from Purchase Request to RFQ Processing outbound process agent 1708 requests the execution of a request for quote. The outbound process agent 1708 uses a Request Request for Quote Execution operation 1712 to send an RFQ Execution Request message 1714 to the RFQ Processing process component 1704. The Request Request for Quote Execution operation 1712 is part of a Request for Quote Out interface 1710.

The RFQ Execution Request message 1714 is received by a Maintain Request for Quote operation 1718 in a Request for Quote In interface 1716, where the operation 1718 initiates a Maintain Request for Quote inbound process agent 1720, which creates or updates a Request For Quote business object out of business documents, such as the Request for Quote business object document 1722, that are involved in the bidding process or in the negotiation process. Next, the Confirm Request for Quote outbound process agent 1724 receives the request for quote and initiates a Confirm Request for Quote operation 1728 in a Request for Quote Out Interface 1726.

The Confirm Request for Quote operation 1728 sends a RFQ Execution Confirmation message 1730 to the Purchase Request processing component 1702 to confirm a RFQ execution. The Change Purchase Request operation 1734, which is part of a Request for Quote In interface 1732, receives the message and initiates a Change Purchase Request based on Request for Quote inbound process agent 1736. The inbound process agent 1736 updates the references of the purchase request in the Purchase Request business object 1706.

Interactions Between Process Components "Supplier Invoice Processing" and "Accounting"

Figure 18:
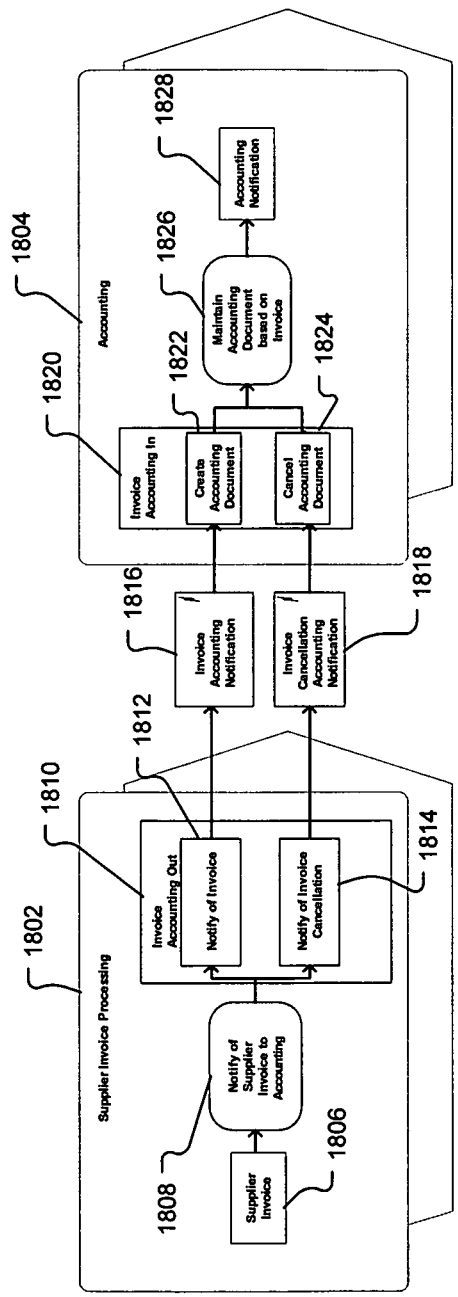
FIG. 18 is a block diagram showing interactions between a Supplier Invoice Processing process component and an Accounting process component.

FIG. 18 is a block diagram showing interactions between a Supplier Invoice Processing process component 1802 and an Accounting process component 1804 in the architectural design of FIG. 1.

The Supplier Invoice Processing process component 1802 includes a Supplier Invoice business object 1806. The Supplier Invoice business object 1806 represents a document that states a recipient's obligation to pay a supplier for goods received or services rendered. For example, the Supplier Invoice business object 1806 may be created after a goods and service acknowledgement has been confirmed. The Supplier Invoice business object 1806 may then trigger a Notify of Supplier Invoice to Accounting outbound process agent 1808, which notifies accounting of the existence of the supplier invoice. For example, once the supplier invoice is posted to the system, the outbound processing agent 1808 sends a notification to accounting stating the Supplier Invoice business object 1806 has been posted.

The processing agent provides an Invoice Accounting Out interface 1810 with the notification and additional data such as invoice billing numbers or a credit memo. Here, the interface 1810 includes a Notify of Invoice operation 1812 and a Request Invoice Cancellation operation 1814. The Notify of Invoice operation 1812 may be invoked if the Invoice Accounting Out interface 1810 receives a notification to post an invoice. Upon performing the Notify of Invoice operation 1812, an Invoice Accounting Notification message 1816 is sent with the invoice accounting notification. Alternatively, the Request Invoice Cancellation operation 1814 may be invoked if the Invoice Accounting interface 1810 receives information requesting a cancellation. For example, the Request Invoice Cancellation operation 1814 may be invoked in order to cancel an invoice. Upon performing the Request Invoice Cancellation operation 1814, an Invoice Cancellation Accounting Notification message 1818 is transmitted to the Accounting process component 1804.

The Accounting process component 1804 includes an Invoice Accounting In interface 1820 that may receive messages sent by the Supplier Invoice Processing process component 1804. Here, the Invoice Accounting interface 1820 includes a Create Accounting Document operation 1822 that creates an accounting document for a customer invoice or supplier invoice if accounting receives the Invoice Accounting Notification message 1816. The Invoice Accounting In interface 1820 also includes a Cancel Accounting Document operation 1824 that cancels a customer or supplier invoice.

The Accounting process component 1804 includes a Maintain Accounting Document based on Invoice inbound process agent 1826 that can maintain accounting documents. For example, the inbound process agent 1826 may update the accounting document if a creation or cancellation operation is received. After updating the accounting document, the inbound process agent 1826 may forward information about the updated document into the Accounting Notification business object 1828. The Accounting Notification business object 1828 may receive input from operational business transactions, such as the invoice notification above, and record the business transactions in a Financial Accounting deployment unit.

Interactions Between Process Components "Internal Request Processing" and "Purchase Request Processing"

Figure 19:
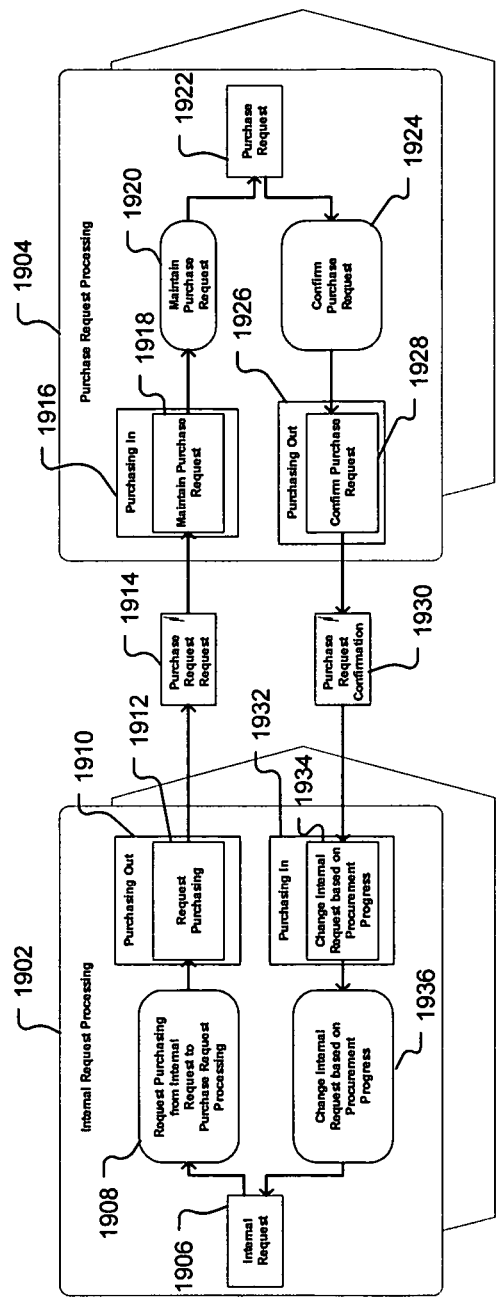
FIG. 19 is a block diagram showing interactions between an Internal Request Processing process component and a Purchase Request Processing process component.

FIG. 19 is a block diagram showing interactions between an Internal Request Processing process component 1902 and a Purchase Request Processing process component 1904 in the architectural design of FIG. 1. The Internal Request Processing process component 1902 includes an Internal Request business object 1906. The Internal Request business object 1906 is a request for the procurement of goods and services. The Internal Request business object 1906 can be fulfilled by a Purchase Request business object or an In-house Requirement business object. An approval of an internal request may trigger a Request Purchasing from Internal Request to Purchase Request Processing outbound process agent 1908. The Request Purchasing from Internal Request to Purchase Request Processing outbound process agent 1908 may initiate to transmit a message for ordering the requested items through a Purchasing Out interface 1910. The Purchasing Out interface 1910 includes a Request Purchasing operation 1912 that may request from a supply planner to procure product or services. The Request Purchasing operation 1912 may also change a previous request. The Request Purchasing operation 1912 sends a Purchase Request Request message 1914 to the Purchase Request Processing process component 1904.

The Purchase Request Processing process component 1904 may receive the Purchase Request Request message 1914 using a Purchasing In interface 1916. Upon receiving the Purchase Request Request message 1914, the Purchasing In interface 1916 includes a Maintain Purchase Request operation 1918 to create or update a request from a requestor to a purchaser to externally procure products (e.g. material, or services). For example, the Maintain Purchase Request operation 1918 may create, using a Maintain Purchase Request inbound process agent 1920, a Purchase Request business object 1922. The Purchase Request business object 1922 is a request or instruction to the purchasing specified goods or services in specified quantities within a specified time.

A creation, update, or cancellation of the Purchase Request business object 1922 may trigger a Confirm Purchase Request outbound process agent 1924. The Confirm Purchase Request outbound process agent 1924 may invoke a Confirmation Purchase Request operation 1928 to transmit a confirmation of the creation, update, or cancellation of the Purchase Request business object 1922. The Confirmation Purchase Request operation 1928 then sends, via a Purchasing Out interface 1926, a Purchase Request Confirmation message 1930 to the Internal Request Processing process component 1902.

The Internal Request Processing process component 1902 receives the Purchase Request Confirmation message 1930 through a Purchasing In interface 1932. The Purchasing In interface 1932 includes a Change Internal Request based on Procurement Progress operation 1934. The Change Internal Request based on Procurement Progress operation 1934 confirms the creation, change, or cancellation of the Purchase Request business object 1922 by updating the Internal Request business object 1906 using a Change Internal Request based on Procurement Progress inbound process agent 1936.

Interactions Between Process Components "Internal Request Processing" and "Goods and Service Acknowledgement"

Figure 20:
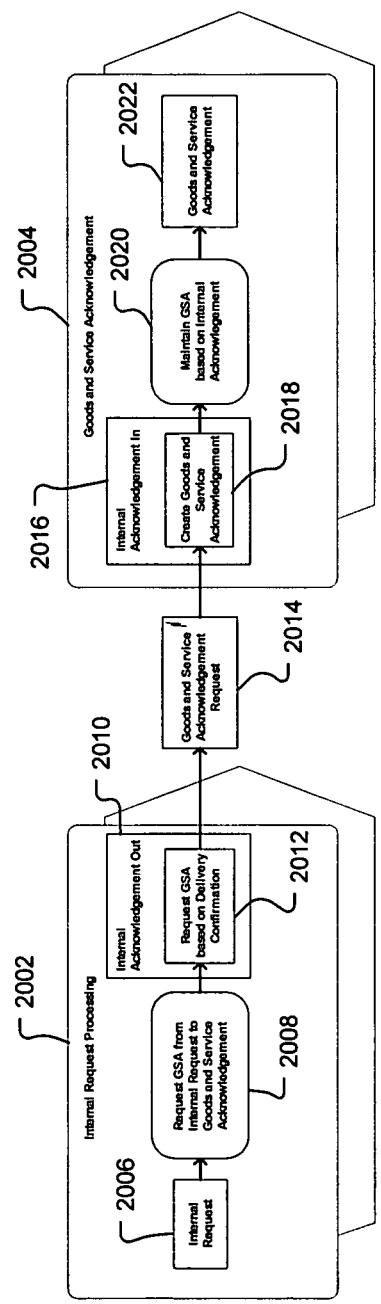
FIG. 20 is a block diagram showing interactions between an Internal Request Processing process component and a Goods and Service Acknowledgement process component.

FIG. 20 is a block diagram showing interactions between an Internal Request Processing process component 2002 and a Goods and Service Acknowledgement process component 2004 in the architectural design of FIG. 1. The Internal Request Processing process component 2002 includes an Internal Request business object 2006 to request goods and services. The Internal Request Processing business object 2006 may be fulfilled by a Purchase request business object or by an In-house Requirement object. The Internal Request Processing business object 2006 sends updates, using a Request GSA from Internal Request to Goods and Service Acknowledgement outbound process agent 2008, to the Goods and Service Acknowledgement process component 2004. An Internal Acknowledgement Out interface 2010 includes a Notify of Goods and Services Acknowledgement operation 2012, which sends a Goods and Service Acknowledgement Notification message 2014 to the Goods and service Acknowledgement process component 2004 about an order of good/services, such as an order of stationary or removal service.

The Goods and Service Acknowledgement process component 2004 receives the message in an Internal Acknowledgement In interface 2016, which includes a Create Goods and Service Acknowledgment operation 2018 to receive Goods and Service Acknowledgement Notification. The Create Goods and Service Acknowledgment operation 2018 creates good and service acknowledgement based on goods and service acknowledgement request. The operation 2018 invokes a Maintain GSA based on Internal Acknowledgement inbound process agent 2020 to send the updates to a Goods and Service Acknowledgement business object 2022. The Goods and Service Acknowledgement business object 2022 is a document that reports the receipt of goods and services. In one example, the Goods and Service Acknowledgement business object 2022 may be used when employees of a company can confirm that they have received the goods and services they ordered through internal requests. In another example, the Goods and Service Acknowledgement business object 2022 may be used when purchasers, or designated recipients of goods and services, can confirm that they have received the goods and services they ordered on behalf of the employees for whom they are responsible. In yet another example, the Goods and Service Acknowledgement business object 2022 may be used when suppliers or service providers can report that they have delivered the requested goods, or have rendered the requested services.

Interactions Between Process Components "Due Item Processing" and "Accounting"

Figure 21:
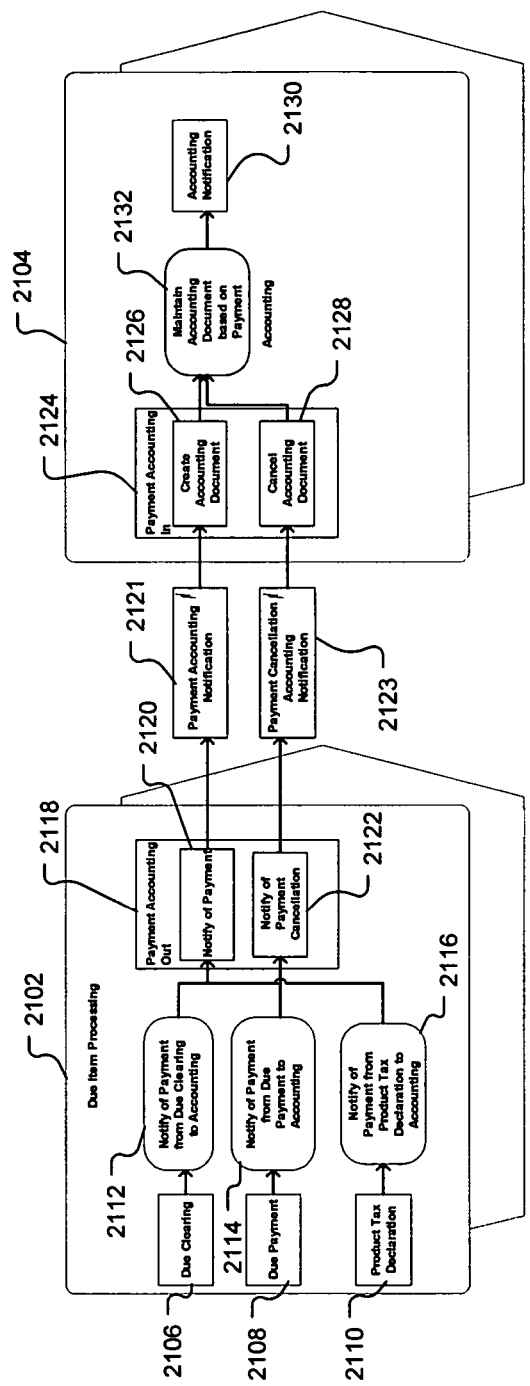
FIG. 21 is a block diagram showing interactions between a Due Item Processing process component and an Accounting process component.

FIG. 21 is a block diagram showing interactions between a Due Item Processing process component 2102 and an Accounting process component 2104 in the architectural design of FIG. 1. The Due Item Processing process component 2102 includes three business objects: a Due Clearing business object 2106 to clear the amounts of the receivables and payables of a group balance to zero taking cash discounts and other deductions into account, a Due Payment business object 2108 to create payment requests for payment processing, and a Product Tax Declaration business object 2110 to declare the product tax liabilities/receivables of a company to the responsible tax authority according to the tax declaration arrangement and country specific legal requirements that triggers the payment to the tax authority.

The business objects send updates into one of three outbound process agents: a Notify of Payment from Due Clearing to Accounting outbound process agent 2112, which sends notification for a clearing of trade receivables and/or payables to Accounting, a Notify of Payment from Due Payment to Accounting outbound process agent 2114, which sends notification to Accounting for inward or outward trade receivables and/or payables payments, and a Notify of Payment from Product Tax Declaration to Accounting 2116, which sends notification for a payment of tax receivables and/or payables to Accounting.

A Payment Accounting Out interface 2118 includes a Notify of Payment operation 2120, which sends a Payment Accounting Notification message 2121 to the Accounting process component 2104 notifying financial accounting about inward or outward movements of trade or tax receivables or payables. Alternatively, a Request Payment Cancellation operation 2122 is invoked that sends a Payment Accounting Cancellation Request message 2123 to the Accounting process component 2104 canceling an inward or outward movement of trade or tax receivables or payables in Financial Accounting.

The Accounting process component 2104 receives the messages in a Payment Accounting In interface 2124, which includes a Create Accounting Document operation 2126 to receive Payment Accounting Notification from Payment Processing or Due Item Processing. If the message received was a cancellation, a Cancel Accounting Document operation 2128 is invoked which cancels the payment processing or due item processing. Updates are sent to an Accounting Notification business object 2130 using a Maintain Accounting Document based on Payment inbound process agent 2132. The Accounting Notification business object 2130 is a common input channel for all kinds of operational business transactions into financial accounting that is called by operational components in order to record the business transactions in Financial Accounting.

Interactions Between Process Components "Goods and Service Acknowledgement" and "Supplier Invoice Processing"

Figure 22:
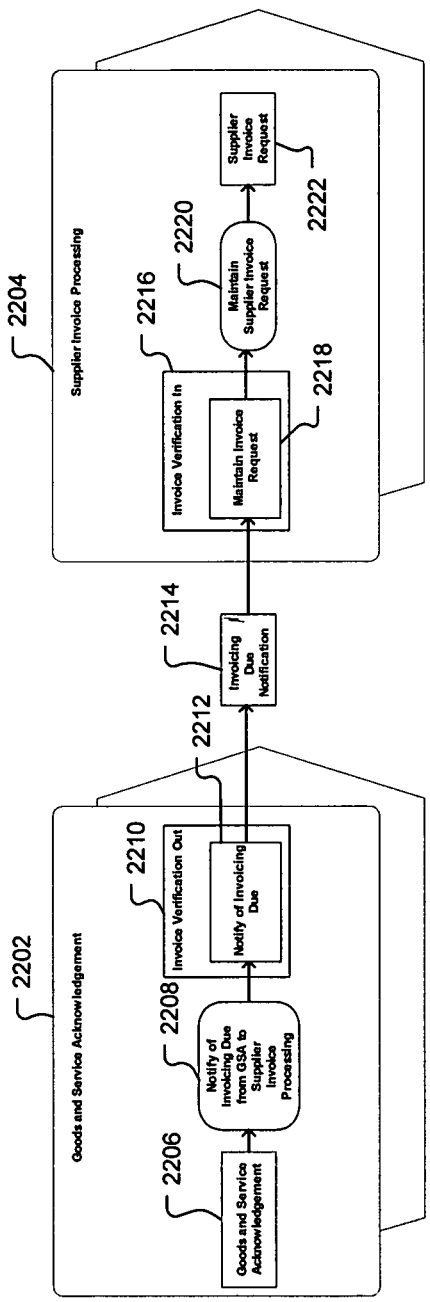
FIG. 22 is a block diagram showing interactions between a Goods and Service Acknowledgement process component and a Supplier Invoice Processing process component.

FIG. 22 is a block diagram showing interactions between a Goods and Service Acknowledgement process component 2202 and a Supplier Invoice Processing process component 2204 in the architectural design of FIG. 1.

The process component interaction model begins the Goods and Service Acknowledgement process component 2202 with a Goods and Service Acknowledgement business object 2206 having an update. The Goods and Service Acknowledgement business object 2206 is a document that reports the receipt of goods and services. When the Goods and Service Acknowledgement business object 2206 is updated, a notification may be sent using a Notify of Invoicing Due from GSA to Supplier Invoice Processing outbound process agent 2208. The Invoice Verification Out interface 2210 includes a Notify of Invoice Due operation 2212 that may be called in case of a change in a contract related invoice is posted. When a GSA is created, the Supplier Invoice Processing process component 2204 needs to be informed because this information is necessary incase of goods receipt based invoice verification. An Invoicing Due Notification message 2214 is sent to an Invoice Verification In interface 2216 in the Supplier Invoice Processing process component 2204. A Maintain Invoice Request operation 2218 may be invoked to create or update a reference object in the Supplier Invoice Processing process component 2204 to perform invoice verification with reference to a purchase order. The reference object is used for checks against the preceding documents and to make proposals for invoice entry. The Supplier Invoice Request business object 2222 is a document for invoice verification that is advising an invoice for specified quantities and prices to be expected or to be created through evaluation settlement. The system uses the Supplier Invoice Request business object 2222 as a basis for invoice verification, as well as for the automatic creation of the invoice. An update to the Supplier Invoice Request business object 2222, will be sent using a Maintain Supplier Invoice Request inbound process agent 2220.

Interactions Between Process Components "Payment Processing" and "Payment Processing at Business Partner"

Figure 23:
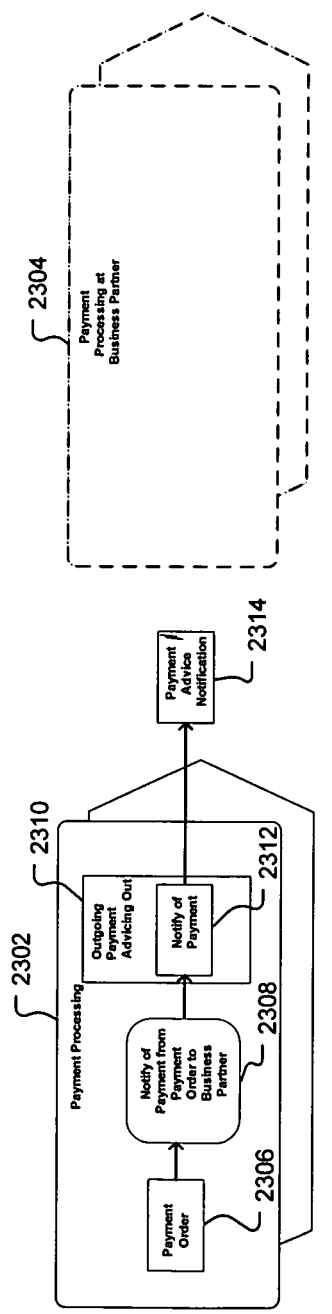
FIG. 23 is a block diagram showing interactions between a Payment Processing process component and a Payment Processing at Business Partner process component.

FIG. 23 is a block diagram showing interactions between a Payment Processing process component 2302 and a Payment Processing at Business Partner process component 2304 in the architectural design of FIG. 1. The Payment Processing process component 2302 is used to handle all incoming and outgoing payments and to represent the main database for a liquidity status. Business partners may be any third party operating an independent system.

The interaction model begins in the Payment Processing process component 2302 with a Payment Order business object 2306. The Payment Order business object 2306 creates payment media for either a bank, a credit card a settlement institute, or a business partner on the base of payment requests. After the payment is created, the Payment Order business object 2306 sends a notification using a Notify of Payment from the Payment Order to the Business Partner outbound process agent 2308. A Payment Order can create different (sub) items within a payment, one for each check, bank transfer etc. that is sent if the payment medium is subject to amount limitations. The Payment Processing process component 2302 also contains an outgoing payment Advicing Out interface 2310 that includes a Notify of Payment operation 2312. The Notify of Payment operation creates a payment advice and sends a Payment Advice Notification message 2314 to the Payment Processing at Business Partner processing component 2304.

The subject matter described in this specification and all of the functional operations described in this specification can be implemented in digital electronic circuitry, or in computer software, firmware, or hardware, including the structural means disclosed in this specification and structural equivalents thereof, or in combinations of them. The subject matter described in this specification can be implemented as one or more computer program products, i.e., one or more computer programs tangibly embodied in an information carrier, e.g., in a machine-readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, subprograms, or portions of code). A computer program can be deployed to be executed on one computer or on multiple computers at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The subject matter described in this specification can be implemented in a computing system that includes a back-end component (e.g., a data server), a middleware component (e.g., an application server), or a front-end component (e.g., a client computer having a graphical user interface or a Web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as an exemplification of preferred embodiments of the invention. Certain features that are described in this specification in the context of separate embodiments, may also be provided in combination in a single embodiment. Conversely, various features that are described in the context of a single embodiment may also be provided in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter has been described in terms of particular variations, but other variations can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

What is claimed is:

1. A computer program product comprising instructions encoded on a non-transitory, tangible machine-readable storage device, the instructions operable when executed by at least one processor to:
define a plurality of process components, each of the process components comprising a modular and application-independent package of reusable, granular software implementing a respective and distinct business process, the business process functionality exposed by the process component via at least one service interface, the plurality of process components including:
an Accounting process component that records relevant business transactions;
an Internal Request Processing process component that processes internal requests;
a Purchase Request Processing process component that provides a request or instruction to a purchasing department to purchase specified goods or services in specified quantities within a specified time;
a Purchase Order Processing process component that processes purchase orders and purchase order confirmations;
a Goods and Service Acknowledgement process component that processes goods and service acknowledgements, which state a recipient's obligation to pay a supplier for goods received or services rendered;
a Supplier Invoice Processing process component that processes supplier invoices, which may be created after a goods and service acknowledgment has been confirmed, and supplier invoice requests, which are sent to invoice verification to advise that an invoice for specified quantities and prices is expected;
a Payment Processing process component that handles incoming and outgoing payments as well as represent a main database for a liquidity status;
a Request for Quote (RFQ) Processing process component that handles requests for quotation and corresponding quotes; and
a Due Item Processing process component that manages payables and receivables from service and supply; and
define a plurality of service interfaces, each service interface associated with exactly one process component and comprising at least one operation, each operation being implemented for exactly one process component, the operations comprising inbound and outbound operations, the outbound operation for a first process component being operable to send a message to a second process component of the plurality of process components, the second process component having an inbound operation for receiving the message, the passing of messages between the inbound and the outbound operations defining a message-based pair-wise interaction between the respective process components of the respective operations, the pair-wise interactions between pairs of the process components including interactions between:
the Payment Processing process component and the Accounting process component, where the pair-wise interaction between the Payment Processing process component and the Accounting process component includes the transmission of:
a payment accounting notification message from the Payment Processing process component to the Accounting process component, the payment accounting notification message notifying accounting of a made payment and causing creation of an accounting document associated with the made payment; and
a payment cancellation accounting notification message from the Payment Processing process component to the Accounting process component, the payment cancellation accounting notification message notifying accounting of the cancellation of a payment and causing cancellation of an accounting document associated with the cancelled payment;
the Internal Request Processing process component and the Supplier Invoice Processing process component, where the pair-wise interaction between the Internal Request Processing process component and the Supplier Invoice Processing process component includes the transmission of:
a supplier invoice request message from the Internal Request Processing process component to the Supplier Invoice Processing process component, the supplier invoice request message requesting the Supplier Invoice Processing process component to handle the creation of a supplier invoice out of delivered goods and rendered services;
the Supplier Invoice Processing process component and the Due Item Processing process component, where the pair-wise interaction between the Supplier Invoice Processing process component and the Due Item Processing process component includes the transmission of:
a receivables payables notification message from the Supplier Invoice Processing process component to the Due Item Processing process component, the receivables payables notification message notifying the Due Item Processing process component of a receivables or payables due for an invoice that has been paid; and a receivables payables cancellation request message from the Supplier Invoice Processing process component to the Due Item Processing process component, the receivables payables cancellation request message requesting cancellation of a previously sent notification for receivables or payables due;

the Purchase Order Processing process component and the Accounting process component, where the pair-wise interaction between the Purchase Order Processing process component and the Accounting process component includes the transmission of:

an order accounting notification message from the Purchase Order Processing process component to the Accounting process component, the order accounting notification message notifying accounting when a purchase order has been created, changed, or cancelled;

the Purchase Order Processing process component and the Supplier Invoice Processing process component, where the pair-wise interaction between the Purchase Order Processing process component and the Supplier Invoice Processing process component includes the transmission of:

an invoicing due notification message from the Purchase Order Processing process component to the Supplier Invoice Processing process component, the invoicing due notification message requesting the creation or updating of an object for performing invoice verification with reference to a purchase order; and a supplier invoice request invoiced values notification message from the Supplier Invoice Processing process component to the Purchase Order Processing process component, the supplier invoice request invoiced values notification message confirming that a corresponding purchase order is not changed to an amount lower than an already-delivered purchase order if parts of a purchase order have been previously posted;

the Goods and Service Acknowledgement process component and the Accounting process component, where the pair-wise interaction between the Goods and Service Acknowledgement process component and the Accounting process component includes the transmission of:

a goods and service acknowledgement accounting notification message from the Goods and Service Acknowledgement process component to the Accounting process component, the goods and service acknowledgment accounting notification message providing accounting information about rendered goods or services to accounting; and a goods and service acknowledgement cancellation request message from the Goods and Service Acknowledgement process component to the Accounting process component, the goods and service acknowledgement cancellation request message providing accounting information about the cancellation of rendered goods or services to accounting;

the Due Item Processing process component and the Payment Processing process component, where the pair-wise interaction between the Due Item Processing process component and the Payment Processing process component includes the transmission of:

a payment order reservation request message from the Due Item Processing process component to the Payment Processing process component, the payment order reservation request message initiating a payment from a product tax declaration; and a payment order reservation confirmation message from the Payment Processing process component to the Due Item Processing process component, the payment order reservation confirmation message confirming the initiation of the payment from the product tax declaration;

the RFQ Processing process component and the Purchase Order Processing process component, where the pair-wise interaction between the RFQ Processing process component and the Purchase Order Processing process component includes the transmission of:

a supplier quote award notification message from the RFQ Processing process component to the Purchase Order Processing process component, the supplier quote award notification message notifying a supplier of a winning offer to sell materials and services according to requested criteria and requesting the creation or update of a purchase order based on an accepted supplier quote;

the Purchase Request Processing process component and the RFQ Processing process component, where the pair-wise interaction between the Purchase Request Processing process component and the RFQ Processing process component includes the transmission of:

an RFQ execution request message from the Purchase Request Processing process component to the RFQ Processing process component, the RFQ execution request message requesting an execution of a request for quote; and an RFQ execution confirmation message from the RFQ Processing process component to the Purchase Request Processing process component, the RFQ execution confirmation message confirming the execution of the request for quote;

the Supplier Invoice Processing process component and the Accounting process component, where the pair-wise interaction between the Supplier Invoice Processing process component and the Accounting process component includes the transmission of:

an invoice accounting notification message from the Supplier Invoice Processing process component to the Accounting process component, the invoice accounting notification message providing a notification to accounting that an invoice stating a recipient's obligation to pay a supplier for goods received or services rendered is posted; and an invoice cancellation accounting notification from the Supplier Invoice Processing process component to the Accounting process component, the invoice cancellation accounting notification providing a notification to accounting that an invoice is cancelled;

the Internal Request Processing process component and the Purchase Request Processing process component, where the pair-wise interaction between the Internal Request Processing process component and the Purchase Request Processing process component includes the transmission of:

a purchase request message from the Internal Request Processing process component to the Purchase Request Processing process component, the purchase request message comprising a request from a supply planner to a purchaser to procure products or services; and a purchase request confirmation message from the Purchase Request Processing process component to the Internal Request Processing process component, the purchase request confirmation message confirming the creation, update, or cancellation of a corresponding purchase request;

the Internal Request Processing process component and the Goods and Service Acknowledgement process component, where the pair-wise interaction between the Internal Request Processing process component and the Goods and Service Acknowledgement process component includes the transmission of:

a goods and services acknowledgment request message from the Internal Request Processing process component to the Goods and Service Acknowledgement process component, the goods and services acknowledgment request message requesting the creation of goods and services acknowledgements;

the Due Item Processing process component and the Accounting process component, where the pair-wise interaction between the Due Item Processing process component and the Accounting process component includes the transmission of:

a payment accounting notification message from the Due Item Processing process component to the Accounting process component, the payment accounting notification message notifying accounting of inward and outward movements of trade or tax receivables and payables; and a payment cancellation accounting notification message from the Due Item Processing process component to the Accounting process component, the payment cancellation accounting notification message notifying accounting of a cancellation of inward or outward movements of trade or tax receivables or payables; and the Goods and Service Acknowledgement process component and the Supplier Invoice Processing process component, where the pair-wise interaction between the Goods and Service Acknowledgement process component and the Supplier Invoice Processing process component includes the transmission of:

an invoicing due notification message from the Goods and Service Acknowledgement process component to the Supplier Invoice Processing process component, the invoicing due notification message providing information of a goods and service acknowledgement to a supplier for purposes of goods receipt based invoice verification; and store the defined process components and service interface in memory.

2. The computer program product of claim 1 wherein:
each of the plurality of process components is assigned to exactly one deployment unit among multiple deployment units, and each deployment unit is deployable on a separate computer hardware platform independent of every other deployment unit; and
all interaction between the process component in one deployment unit and any other process component in any other deployment unit takes place through the respective service interfaces of the two process components.

3. The computer program product of claim 2, wherein the deployment units comprise:
a Financial Accounting deployment unit that includes the Accounting process component;
a Requisitioning deployment unit that includes the Internal Request Processing process component;
a Purchasing deployment unit that includes the Purchase Request Processing process component, the Purchase Order Processing process component, and the Goods and Service Acknowledgement process component;
a Supplier Invoicing deployment unit that includes the Supplier Invoice Processing process component;
a Payment deployment unit that includes the Payment Processing process component;
an RFQ deployment unit that includes the RFQ Processing process component; and
a Due Item Management deployment unit that includes the Due Item Processing process component.

4. The computer program product of claim 1, wherein:
each of the process components includes at least one business object; and
none of the business objects of any one of the process components interacts directly with any of the business objects included in any of the other process components.

5. The computer program product of claim 4, wherein the business objects comprise a business process object.

6. The computer program product of claim 4, wherein:
none of the business objects included in any one of the process components is included in any of the other process components.

7. The computer program product of claim 1, further comprising:
a plurality of process agents, each process agent being either an inbound process agent or an outbound process agent, the inbound process agent being operable to receive a message from the inbound operation, the outbound process agent being operable to cause the outbound operation to send a message, each process agent being associated with exactly one process component.

8. The computer program product of claim 7, wherein:
the inbound process agents comprise a first inbound process agent operable to start the execution of a step requested in a first inbound message by creating or updating at least one business object instance.

9. The computer program product of claim 7, wherein:
the outbound process agents comprise a first asynchronous outbound process agent that is called after a business object that is associated with the first outbound process agent changes.

10. The computer program product of claim 1, wherein the operations comprise synchronous and asynchronous operations.

11. A computer system, comprising:
at least one hardware platform for executing a computer software application, the computer software application structured as a plurality of process components interacting with each other through service interfaces, each hardware platform including at least one processor configured to execute the computer software application;
memory storing the plurality of process components, each of the process components comprising a modular and application-independent package of reusable software implementing a respective and distinct business process, the business process comprising functionality exposed by the process component via at least one service interface, the plurality of process components including:
an Accounting process component that records relevant business transactions;
an Internal Request Processing process component that processes internal requests;
a Purchase Request Processing process component that provides a request or instruction to a purchasing department to purchase specified goods or services in specified quantities within a specified time;
a Purchase Order Processing process component that processes purchase orders and purchase order confirmations;
a Goods and Service Acknowledgement process component that processes goods and service acknowledgements, which state a recipient's obligation to pay a supplier for goods received or services rendered;
a Supplier Invoice Processing process component that processes supplier invoices, which may be created after a goods and service acknowledgment has been confirmed, and supplier invoice requests, which are sent to invoice verification to advise that an invoice for specified quantities and prices is expected;
a Payment Processing process component that handles incoming and outgoing payments as well as represent a main database for a liquidity status;
an RFQ Processing process component that handles requests for quotation and corresponding quotes; and
a Due Item Processing process component that manages payables and receivables from service and supply; and the memory further storing a plurality of service interfaces, each service interface associated with exactly one process component and comprising at least one operation, each operation being implemented for exactly one process component, the operations comprising inbound and outbound operations, the outbound operation for a first process component being operable to send a message to a second process component of the plurality of process components, the second process component having an inbound operation for receiving the message, the passing of messages between the inbound and the outbound operations defining a message-based pair-wise interaction between the respective process components of the respective operations, the pair-wise interactions between pairs of the process components including interactions between:

the Payment Processing process component and the Accounting process component, where the pair-wise interaction between the Payment Processing process component and the Accounting process component includes the transmission of:
a payment accounting notification message from the Payment Processing process component to the Accounting process component, the payment accounting notification message notifying accounting of a made payment and causing creation of an accounting document associated with the made payment; and
a payment cancellation accounting notification message from the Payment Processing process component to the Accounting process component, the payment cancellation accounting notification message notifying accounting of the cancellation of a payment and causing cancellation of an accounting document associated with the cancelled payment;

the Internal Request Processing process component and the Supplier Invoice Processing process component, where the pair-wise interaction between the Internal Request Processing process component and the Supplier Invoice Processing process component includes the transmission of:
a supplier invoice request message from the Internal Request Processing process component to the Supplier Invoice Processing process component, the supplier invoice request message requesting the Supplier Invoice Processing process component to handle the creation of a supplier invoice out of delivered goods and rendered services;

the Supplier Invoice Processing process component and the Due Item Processing process component, where the pair-wise interaction between the Supplier Invoice Processing process component and the Due Item Processing process component includes the transmission of:
a receivables payables notification message from the Supplier Invoice Processing process component to the Due Item Processing process component, the receivables payables notification message notifying the Due Item Processing process component of a receivables or payables due for an invoice that has been paid; and
a receivables payables cancellation request message from the Supplier Invoice Processing process component to the Due Item Processing process component, the receivables payables cancellation request message requesting cancellation of a previously sent notification for receivables or payables due;

the Purchase Order Processing process component and the Accounting process component, where the pair-wise interaction between the Purchase Order Processing process component and the Accounting process component includes the transmission of:
an order accounting notification message from the Purchase Order Processing process component to the Accounting process component, the order accounting notification message notifying accounting when a purchase order has been created, changed, or cancelled;

the Purchase Order Processing process component and the Supplier Invoice Processing process component, where the pair-wise interaction between the Purchase Order Processing process component and the Supplier Invoice Processing process component includes the transmission of:
an invoicing due notification message from the Purchase Order Processing process component to the Supplier Invoice Processing process component, the invoicing due notification message requesting the creation or updating of an object for performing invoice verification with reference to a purchase order; and
a supplier invoice request invoiced values notification message from the Supplier Invoice Processing process component to the Purchase Order Processing process component, the supplier invoice request invoiced values notification message confirming that a corresponding purchase order is not changed to an amount lower than an already-delivered purchase order if parts of a purchase order have been previously posted;

the Goods and Service Acknowledgement process component and the Accounting process component, where the pair-wise interaction between the Goods and Service Acknowledgement process component and the Accounting process component includes the transmission of:
  a goods and service acknowledgement accounting notification message from the Goods and Service Acknowledgement process component to the Accounting process component, the goods and service acknowledgment accounting notification message providing accounting information about rendered goods or services to accounting; and
  a goods and service acknowledgement cancellation request message from the Goods and Service Acknowledgement process component to the Accounting process component, the goods and service acknowledgement cancellation request message providing accounting information about the cancellation of rendered goods or services to accounting;
the Due Item Processing process component and the Payment Processing process component, where the pair-wise interaction between the Due Item Processing process component and the Payment Processing process component includes the transmission of:
  a payment order reservation request message from the Due Item Processing process component to the Payment Processing process component, the payment order reservation request message initiating a payment from a product tax declaration; and
  a payment order reservation confirmation message from the Payment Processing process component to the Due Item Processing process component, the payment order reservation confirmation message confirming the initiation of the payment from the product tax declaration;
the RFQ Processing process component and the Purchase Order Processing process component, where the pair-wise interaction between the RFQ Processing process component and the Purchase Order Processing process component includes the transmission of:
  a supplier quote award notification message from the RFQ Processing process component to the Purchase Order Processing process component, the supplier quote award notification message notifying a supplier of a winning offer to sell materials and services according to requested criteria and requesting the creation or update of a purchase order based on an accepted supplier quote;
the Purchase Request Processing process component and the RFQ Processing process component, where the pair-wise interaction between the Purchase Request Processing process component and the RFQ Processing process component includes the transmission of:
  an RFQ execution request message from the Purchase Request Processing process component to the RFQ Processing process component, the RFQ execution request message requesting an execution of a request for quote; and
  an RFQ execution confirmation message from the RFQ Processing process component to the Purchase Request Processing process component, the RFQ execution confirmation message confirming the execution of the request for quote;
the Supplier Invoice Processing process component and the Accounting process component, where the pair-wise interaction between the Supplier Invoice Processing process component and the Accounting process component includes the transmission of:
  an invoice accounting notification message from the Supplier Invoice Processing process component to the Accounting process component, the invoice accounting notification message providing a notification to accounting that an invoice stating a recipient's obligation to pay a supplier for goods received or services rendered is posted; and
  an invoice cancellation accounting notification from the Supplier Invoice Processing process component to the Accounting process component, the invoice cancellation accounting notification providing a notification to accounting that an invoice is cancelled;
the Internal Request Processing process component and the Purchase Request Processing process component, where the pair-wise interaction between the Internal Request Processing process component and the Purchase Request Processing process component includes the transmission of:
  a purchase request message from the Internal Request Processing process component to the Purchase Request Processing process component, the purchase request message comprising a request from a supply planner to a purchaser to procure products or services; and
  a purchase request confirmation message from the Purchase Request Processing process component to the Internal Request Processing process component, the purchase request confirmation message confirming the creation, update, or cancellation of a corresponding purchase request;
the Internal Request Processing process component and the Goods and Service Acknowledgement process component, where the pair-wise interaction between the Internal Request Processing process component and the Goods and Service Acknowledgement process component includes the transmission of:
  a goods and services acknowledgment request message from the Internal Request Processing process component to the Goods and Service Acknowledgement process component, the goods and services acknowledgment request message requesting the creation of goods and services acknowledgements;
the Due Item Processing process component and the Accounting process component, where the pair-wise interaction between the Due Item Processing process component and the Accounting process component includes the transmission of:
  a payment accounting notification message from the Due Item Processing process component to the Accounting process component, the payment accounting notification message notifying accounting of inward and outward movements of trade or tax receivables and payables; and
  a payment cancellation accounting notification message from the Due Item Processing process component to the Accounting process component, the payment cancellation accounting notification message notifying accounting of a cancellation of inward or outward movements of trade or tax receivables or payables; and
the Goods and Service Acknowledgement process component and the Supplier Invoice Processing process component, where the pair-wise interaction between the Goods and Service Acknowledgement process component and the Supplier Invoice Processing process component includes the transmission of:

an invoicing due notification message from the Goods and Service Acknowledgement process component to the Supplier Invoice Processing process component, the invoicing due notification message providing information of a goods and service acknowledgement to a supplier for purposes of goods receipt based invoice verification.

12. The computer system of claim 11, wherein:

each of the process components includes at least one business object; and none of the business objects of any one of the process components interacts directly with any of the business objects included in any of the other process components.

13. The computer system of claim 11, wherein:

none of the business objects included in any one of the process components is included in any of the other process components.

14. The computer system of claim 11, wherein:

a plurality of process agents, each process agent being either an inbound process agent or an outbound process agent, the inbound process agent being operable to receive a message from the inbound operation, the outbound process agent being operable to cause the outbound operation to send a message, each process agent being associated with exactly one process component.

15. The computer system of claim 11, the system comprising multiple hardware platforms, wherein:

the Accounting process component is deployed on a first hardware platform;

the Internal Request Processing process component is deployed on a second hardware platform;

the Purchase Request Processing process component, the Purchase Order Processing process component, and the Goods and Service Acknowledgement process component are deployed on a third hardware platform;

the Supplier Invoice Processing process component is deployed on a fourth hardware platform;

the Payment Process component is deployed on a fifth hardware platform;

the RFQ Processing process component is deployed on a sixth hardware platform; and the Due Item Processing process component is deployed on a seventh hardware platform.

16. The computer system of claim 15, wherein each of the first through the seventh hardware platforms are distinct and separate from each other.

\* \* \* \* \*